(12) United States Patent
Yoshimura

(10) Patent No.: US 8,866,851 B2
(45) Date of Patent: Oct. 21, 2014

(54) DISPLAYING A SEQUENCE OF IMAGES AND ASSOCIATED CHARACTER INFORMATION

(75) Inventor: Hideyuki Yoshimura, Tokyo (JP)

(73) Assignee: Sony Corporation (JP)

( * ) Notice: Subject to any disclaimer, the term of this patent is extended or adjusted under 35 U.S.C. 154(b) by 310 days.

(21) Appl. No.: 13/423,643

(22) Filed: Mar. 19, 2012

(65) Prior Publication Data
US 2012/0249572 A1    Oct. 4, 2012

(30) Foreign Application Priority Data
Mar. 30, 2011   (JP) .................... 2011-074082

(51) Int. Cl.
| G09G 5/00 | (2006.01) |
| H04N 7/173 | (2011.01) |
| G06F 3/00 | (2006.01) |
| H04N 21/431 | (2011.01) |
| H04N 21/81 | (2011.01) |
| H04N 21/485 | (2011.01) |
| H04N 13/00 | (2006.01) |
| H04N 21/488 | (2011.01) |

(52) U.S. Cl.
CPC ....... *H04N 21/4312* (2013.01); *H04N 21/8126* (2013.01); *H04N 21/485* (2013.01); *H04N 13/007* (2013.01); *H04N 21/488* (2013.01); *H04N 21/8146* (2013.01); *H04N 13/0022* (2013.01)
USPC .............. 345/636; 725/151; 725/40; 725/44; 715/765

(58) Field of Classification Search
CPC ....... H04N 13/007; H04N 13/00; H04N 9/82; H04N 9/8205; H04N 9/8233; H04N 13/004; H04N 13/0062; H04N 13/0022
See application file for complete search history.

(56) References Cited

U.S. PATENT DOCUMENTS

| 2002/0122136 A1* | 9/2002 | Safadi et al. ................. 348/465 |
| 2005/0210416 A1* | 9/2005 | MacLaurin et al. ......... 715/851 |
| 2008/0170155 A1* | 7/2008 | Cooper et al. ................ 348/564 |
| 2010/0220175 A1* | 9/2010 | Claydon et al. ................ 348/43 |

FOREIGN PATENT DOCUMENTS

| EP | 2309463 A2 | 4/2011 |
| JP | 2010-199711 A | 9/2010 |
| WO | 2009157893 A1 | 12/2009 |
| WO | 2010099495 A2 | 9/2010 |

OTHER PUBLICATIONS

European Search Report EP Application No. 12160848, dated Dec. 4, 2012.

* cited by examiner

*Primary Examiner* — Carlos Perromat
*Assistant Examiner* — Nurun N Flora
(74) *Attorney, Agent, or Firm* — Lerner, David, Littenberg, Krumholz & Mentlik, LLP

(57) ABSTRACT

According to an illustrative embodiment, a display controller is provided. The display controller includes a control section for controlling a display to display a sequence of images, first character information corresponding to a first displayed image of the sequence of images, and other character information corresponding to an image in the sequence of images which is prior to the first displayed image, wherein the control section controls display of the first character information and the other character information in response to a user operation.

10 Claims, 18 Drawing Sheets

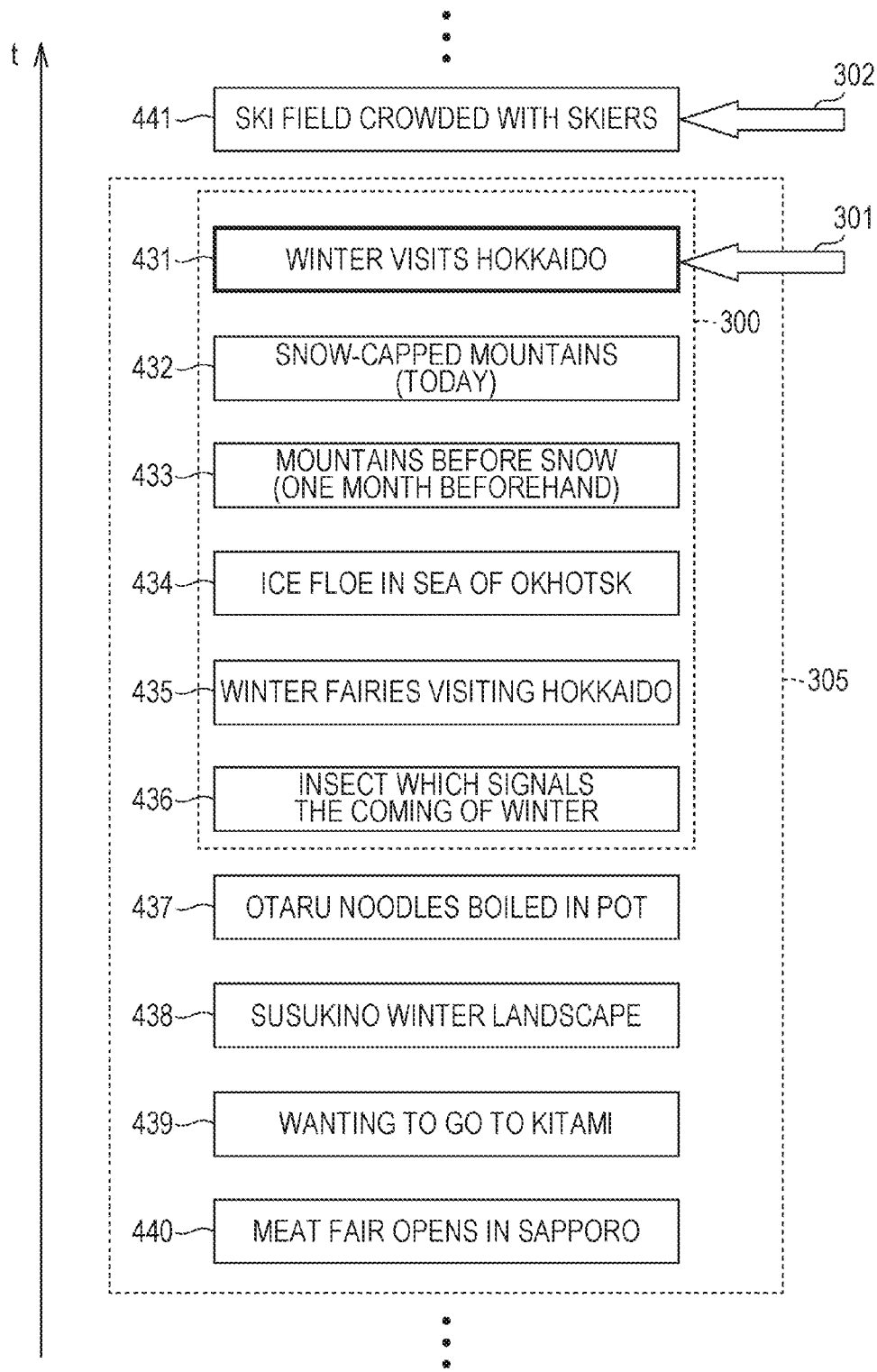

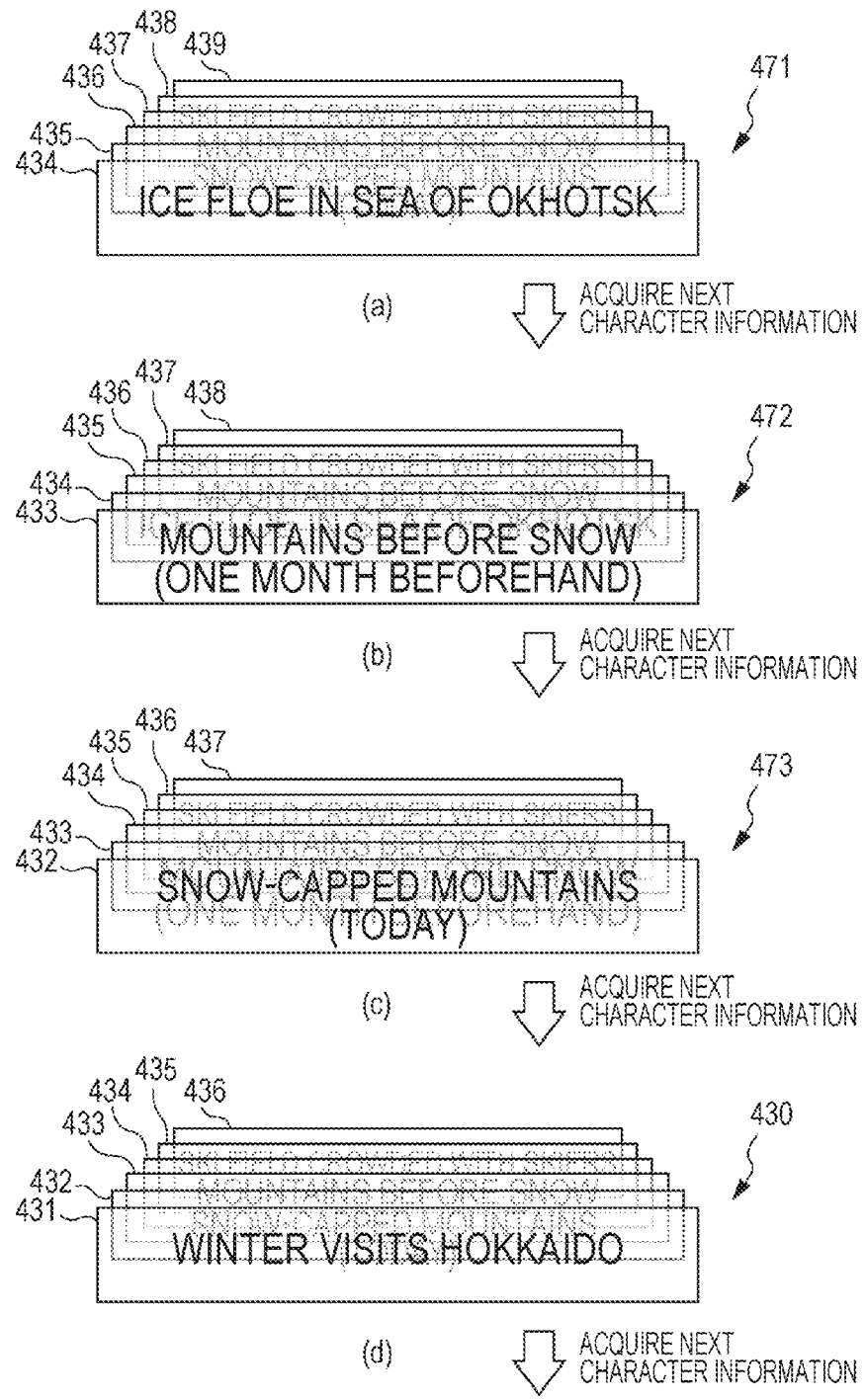

DISPLAYING A SEQUENCE OF IMAGES AND ASSOCIATED CHARACTER INFORMATION

CROSS-REFERENCE TO RELATED APPLICATION

The present application claims priority from Japanese Patent Application No. JP 2011-074082, filed in the Japanese Patent Office on Mar. 30, 2011, the entire content of which is hereby incorporated by reference herein.

BACKGROUND

The present disclosure relates to an information processing device. In particular, the present disclosure relates to an information processing device and an information processing method which displays an image, and a program which makes a computer execute the method.

In the past, information processing devices such as a television reception device, which receives broadcasting waves from each broadcasting station and displays an image based on broadcasting waves, are in wide spread use. In addition, an information processing device is proposed which, along with the image which is a display target, displays character information which relates to the image (for example, subtitles or captions).

For example, a content processing device is proposed which displays subtitles where Chinese characters used in Japanese are accompanied with Japanese syllabary and subtitles where Chinese characters used in Japanese are not accompanied with Japanese syllabary so as to overlap with an image (for example, Japanese Unexamined Patent Application Publication No. 2010-199711).

SUMMARY

In the techniques in the related art described above, it is possible for the user to easily obtain character information related to an image in a visual manner by viewing character information which is displayed along with the image.

Here, for example, in a case where an image is displayed based on broadcasting waves from a broadcasting station, a time when the character information is displayed is a time which is determined by at the broadcasting station which outputs the broadcasting waves. As a result, for example, in a case where a user moves their eyes away from a display screen and misses out on reading character information, it is not possible to view the character information of which the reading was missed when the character information which follows the character information of which the reading was missed is displayed.

It is desirable that the user easily view desired character information.

In view of the foregoing, the present embodiments are provided. According to an illustrative embodiment, a display controller is provided. The display controller includes a control section for controlling a display to display a sequence of images, first character information corresponding to a first displayed image of the sequence of images, and other character information corresponding to an image in the sequence of images which is prior to the first displayed image, wherein the control section controls display of the first character information and the other character information in response to a user operation.

According to the present disclosure, a superior effect where the user is able to easily view desired character information is able to be realized.

BRIEF DESCRIPTION OF THE DRAWINGS

FIG. 4 is a diagram illustrating character information, which is a holding target of the character information holding section according to the first embodiment of the present disclosure, in a time line in a simplified manner;

FIG. 8 is a diagram illustrating a transition example of character information displayed in the display section according to the first embodiment of the present disclosure;

DETAILED DESCRIPTION OF EMBODIMENTS

Below, embodiments of the disclosure will be described. Here, the description will be performed in the order below.
1. First Embodiment (Display Control: Example where Character Information Continuous in Time Line is Displayed to be Lined up in Depth Direction And Foremost Character Information is Changed based on User Operation)
2. Second Embodiment (Display Control: Example where Character Information Continuous in Time Line is Displayed as Stereoscopic Image)

1. First Embodiment

Configuration Example of Information Processing Device

Figure 1:
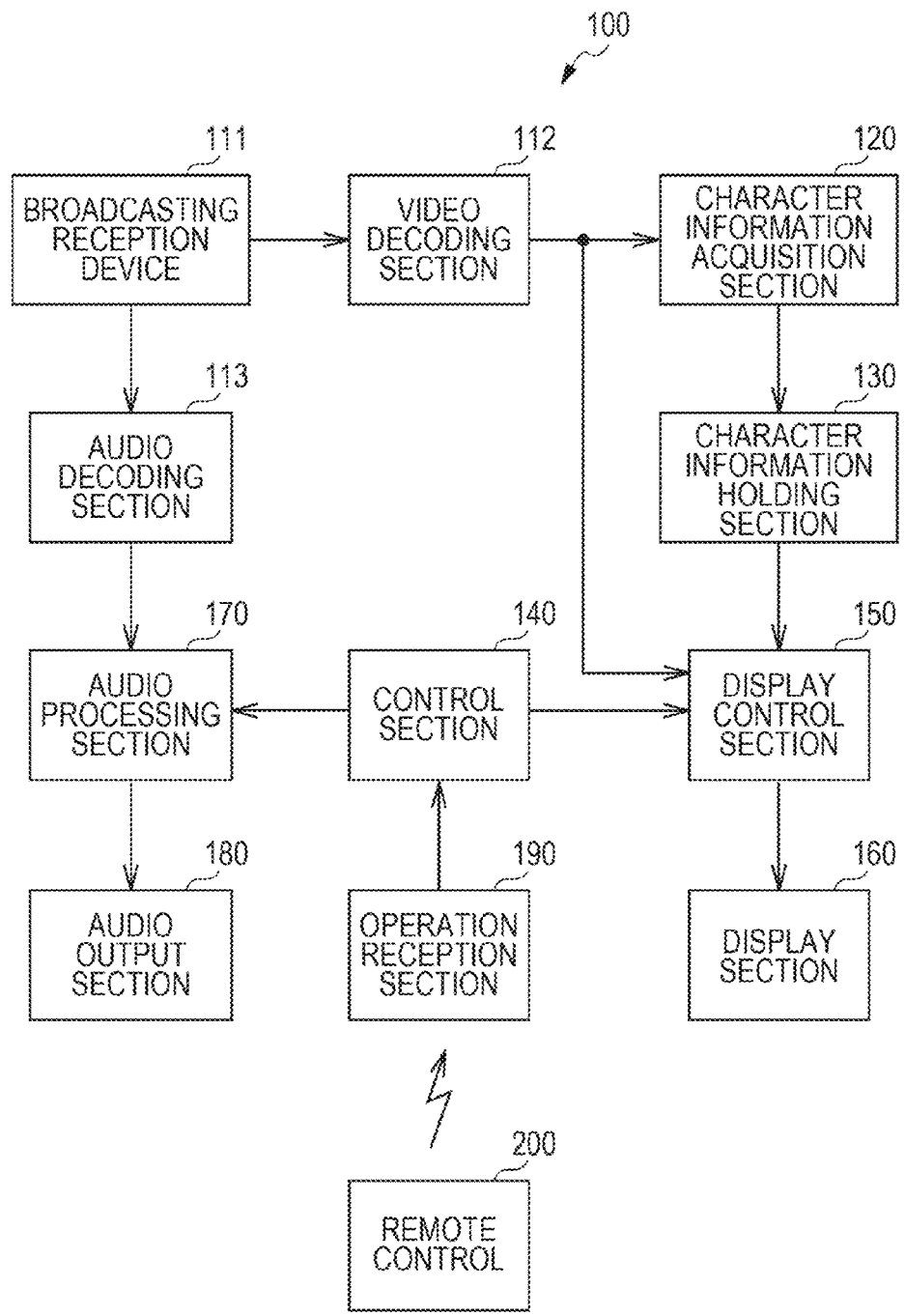
FIG. 1 is a block diagram illustrating a functional configuration example of an information processing device according to a first embodiment of the present disclosure.

FIG. 1 is a block diagram illustrating a functional configuration example of an information processing device 100 according to a first embodiment of the present disclosure.

The information processing device 100 is provided with a broadcasting reception device 111, a video decoding section 112, an audio decoding section 113, a character information acquisition section 120, and a character information holding section 130. The information processing device 100 is provided with a control section 140, a display control section 150, a display section 160, an audio processing section 170, an audio output section 180, and an operation reception section 190. The information processing device 100 is, for example, realized using a television reception device which receives broadcasting waves from each broadcasting station and displays an image (a stereoscopic image and a planar image).

The broadcasting reception device 111 receives broadcasting waves from each broadcasting station via an antenna (not shown) and demodulates the video signal and the audio signal. The broadcasting reception device 111 receives broadcasting waves such as terrestrial digital television broadcasting, CS (Communications Satellite) digital broadcasting, and BS (Broadcasting Satellite) digital broadcasting. Then, the broadcasting reception device 111 outputs the demodulated video signal to the video decoding section 112 and the demodulated audio signal to the audio signal decoding section 113.

The video decoding section 112 reconstructs the video data by a process for decoding the video signal output from the broadcasting reception device 111 (the video signal which is compressed and coded for transmission) and outputs the reconstructed video data to the character information acquisition section 120 and the display control section 150.

The audio decoding section 113 reconstructs the audio data by a process for decoding the audio signal output from the broadcasting reception device 111 (the audio signal which is compressed and coded for transmission) and outputs the reconstructed audio data to the audio processing section 170.

The character information acquisition section 120 acquires character information related to the video data which is output from the video decoding section 112 and holds the acquired character information in the character information holding section 130. For example, a case is assumed where the video and audio content are a data format based on a MPEG (Moving Picture Experts Group) standard. In this case, it is possible for the character information acquisition section 120 to acquire subtitle information by extracting a subtitle PES (Packetized Elementary Stream) (subtitle mode (413) shown in FIG. 5). In addition, for example, a character which is included in the display target image may be captured (so-called character caption capture) and the character information is acquired as character information (capture mode (412) shown in FIG. 5). For example, the character information acquisition section 120 extracts a string of characters, where a predetermined number or more are continuous, from a display target image using character recognition techniques (for example, a template matching process) and acquires the extracted string of characters as the character information by capturing.

The character information holding section 130 holds the character information which is acquired by the character information acquisition section 120 and supplies the held character information to the display control section 150. The character information content held in the character information holding section 130 will be described in detail with reference to FIGS. 3A and 3B.

The control section 140 performs various controls based on a control program which is stored in a memory (not shown). The control section 140 is configured by, for example, a microprocessor. In addition, for example, the control section 140 performs control so as to change the character information which is the earliest character information (for example, the foremost character information) from a plurality of items of character information based on a user operation.

The display control section 150 performs an output process for outputting video (images) corresponding to broadcasting waves which are received by the broadcasting reception section 111 based on the control of the control section 140. In addition, the display control section 150 acquires the character information which is held by the character information holding section 130 and displays the acquired character information along with the moving images in the display section 160 based on the control of the control section 140.

Figure 7A:
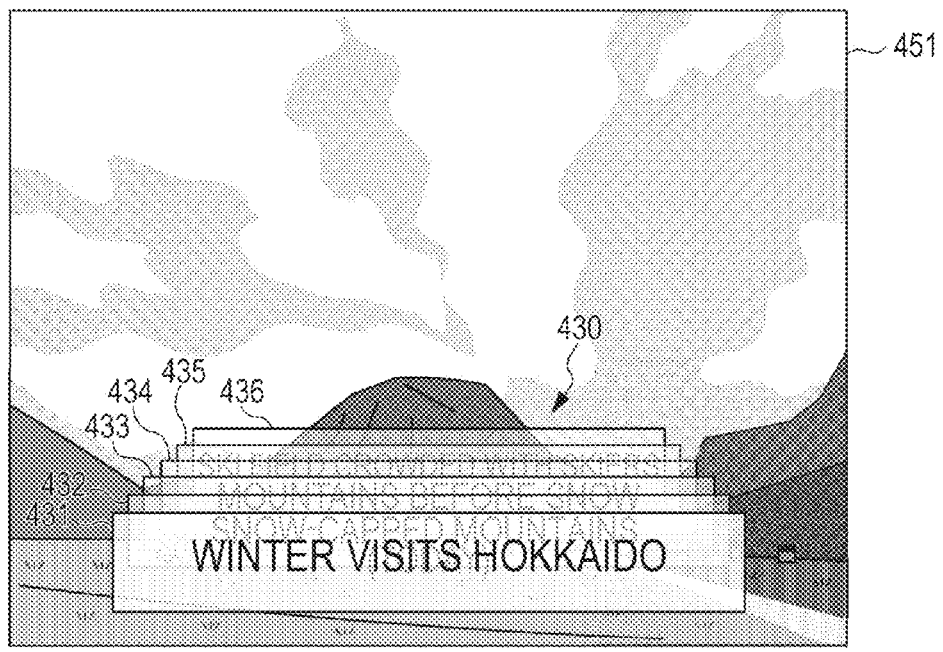
FIGS. 7A and 7B are diagrams illustrating a display example of character information displayed in the display section according to the first embodiment of the present disclosure.
Figure 7B:
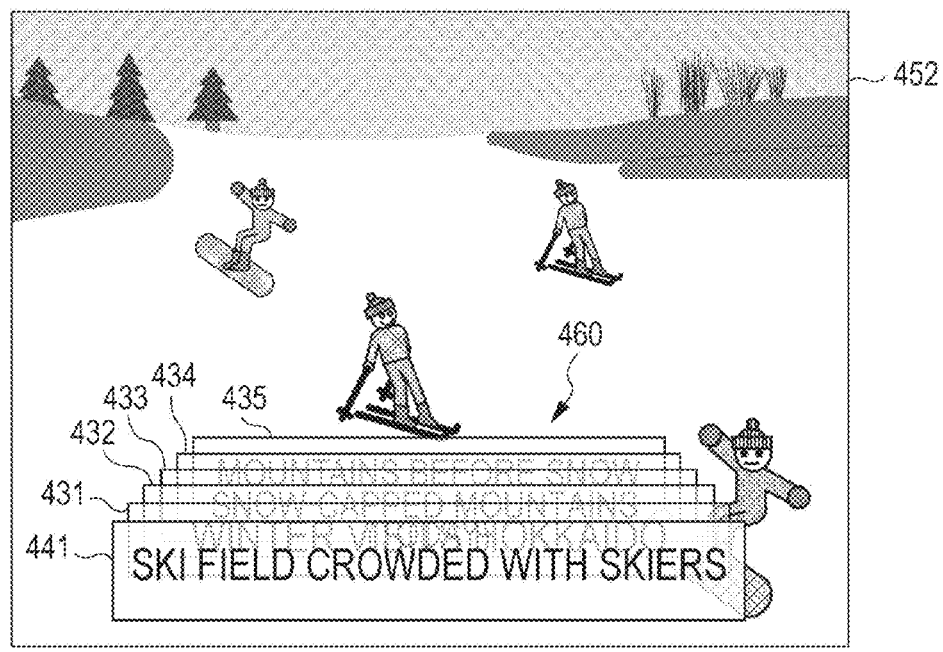

For example, the display control section 150 lines up the plurality of items of character information related to the moving images, which correspond to broadcasting waves received by the broadcasting reception section 111, in a predetermined direction along the time axis and displays the plurality of items of character information along with the moving images in the display section 160 (for example, the display example shown in FIGS. 7A and 7B). In this case, one out of the plurality of items of character information related to the moving images is set as the earliest character information (for example, the foremost character information) and sets the earliest character information and one item of or a plurality of items of character information which is continuous with the earliest character information on the time axis as the display target character information. Then, the display control section 150 displays so that the display target character information is lined up in the predetermined direction from the earliest character information along the time axis and overlaps with the moving images. Here, it is possible for the predetermined direction to be set as, for example, a direction (depth direction) which goes substantially straight through a display surface of the display section 160.

In addition, for example, the display control section 150 displays so as to line up the display target character information in the predetermined direction by overwriting and combining the display target character information along the time axis so that the earliest character information is in front. In addition, for example, the display control section 150 sets the transparency (for example, an α value) in a display region of the display target character information so as to be reduced in accordance with heading in the predetermined direction from the earliest character information. In this case, it is preferable to set the transparency only in a background region of the characters out of the display region of the display target character information.

The display section 160 is a display section where various types of images are displayed based on the control of the display control section 150. It is possible for the display section 160 to be realised, for example, using a display element such as an LCD (Liquid Crystal Display).

The audio processing section 170 performs an output process for outputting the audio corresponding to broadcasting waves which are received by the broadcasting reception section 111 based on the control of the control section 140.

The audio output section 180 outputs various types of audio information based on the control of the audio processing section 170. It is possible for the audio output section 180 to be realised, for example, using a speaker or the like.

The operation reception section 190 is an operation reception section which receives operational input by a user and supplies the operation signal according to the received operation input to the control section 140. In addition, when an operation signal is received from a remote control 200, the operation reception section 190 supplies the operation signal according to the received operation input to the control section 140.

The remote control 200 is a remote control for remotely controlling from a location which is separated from the information processing device 100 and outputs an operation signal (output signal) according to the operation input by a user to the operation reception section 190. For example, it is possible for an infrared signal to be used as the output signal of the remote control 200. In addition, the external configuration of the remote control 200 will be described in detail with reference to FIG. 2.

Configuration of Remote Control

Figure 2:
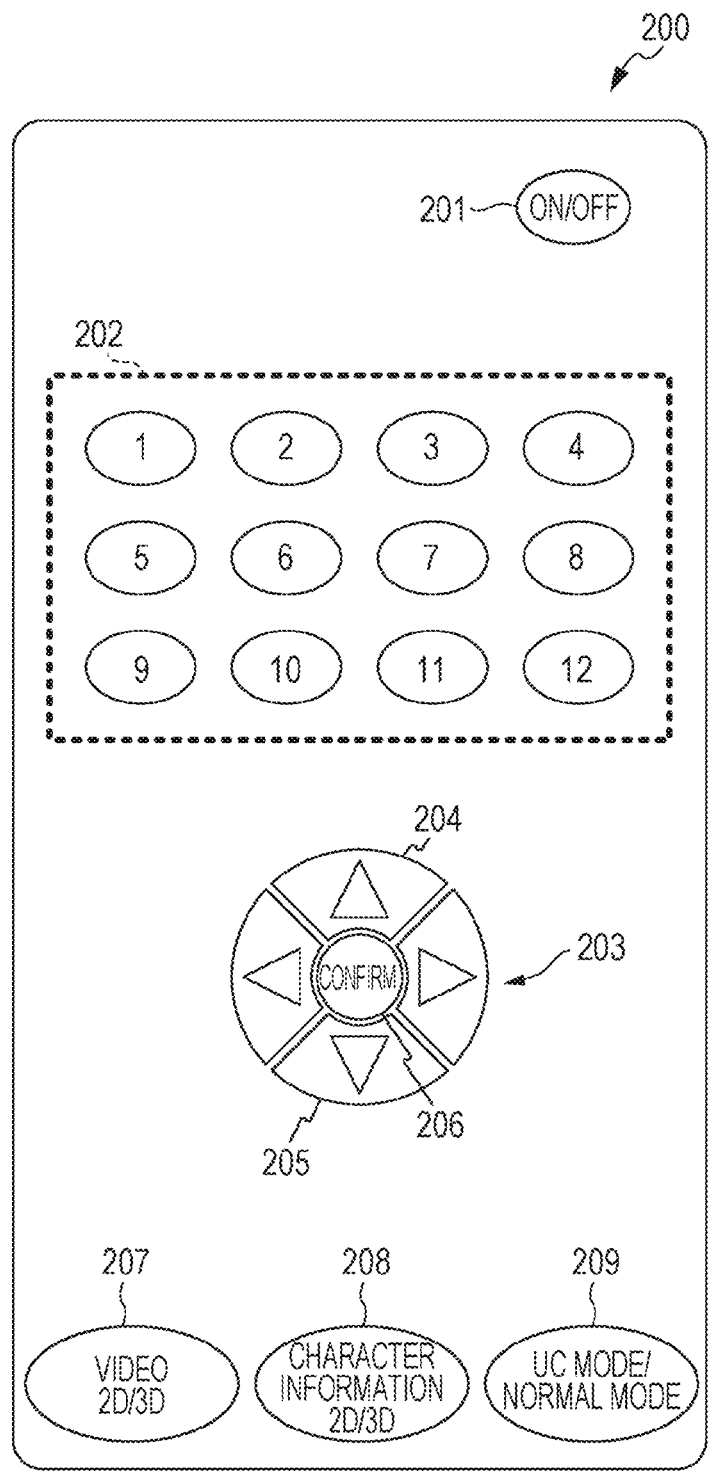
FIG. 2 is a diagram illustrating an external configuration example of a remote control according to the first embodiment of the present disclosure.

FIG. 2 is a diagram illustrating an external configuration example of the remote control 200 according to the first embodiment of the present disclosure.

In the remote control 200, a power source button 201, a channel specifying button grouping 202, an arrow determination button grouping 203, a video 2D/3D switching button 207, a character information 2D/3D switching button 208, and a mode switching button 209.

The power source button 201 is a button used when turning the power of the information processing device 100 on or off.

The channel specifying button grouping 202 is a group of buttons used when specifying a broadcasting channel in a case of viewing a broadcasting program based on broadcasting waves using the information processing device 100.

The arrow determination button grouping 203 is configured using up, down, left and right arrow buttons (including an up button 204 and a down button 205) and a confirm button 206 which are used when a menu screen or the like is displayed in the display screen 160. The up, down, left and right arrow buttons are buttons used when performing a selection operation in the up, down, left and right directions in a display screen which is displayed in the display section 160, and for example, are used in a case of moving a selection state up, down, left and right when performing a selection operation on a menu screen. The confirm button 206 is a button used when performing various confirming operations in a display screen which is displayed on the display section 160, and for example, is used in a case of confirming a selection state in the menu screen.

The video 2D/3D switching button 207 is a button used when switching a broadcasting channel between either a planar image (2D image) or a stereoscopic image (3D image) in a case of viewing a broadcasting program based on broadcasting waves.

The character information 2D/3D switching button 208 is a button used when switching the character information which is linked to a broadcasting channel between either a planar image (2D image) or a stereoscopic image (3D image) in a case of viewing a broadcasting program based on broadcasting waves. Here, a display method in a case where the character information is switched to a stereoscopic image (3D image) is shown in the second embodiment of the present disclosure.

The mode switching button 209 is a button used when switching between either a normal mode or a UC (user control) mode in a case where a character information display mode where the character information is displayed is set.

Here, the normal mode is a character information display mode where the foremost character information is sequentially updated based on a display timing which is set in advance. Here, in a case where the foremost character information is updated, the past character information moves to the rear in the depth direction. In this case, since the readable of the foremost character information is emphasized, a portion of the past character information is displayed to the extent that it is able to be seen. By displaying the past character information in this manner, it is possible for a user to easily confirm the display of character information at a timing before the foremost character information. Here, a display example of the normal mode will be described in detail with reference to FIGS. 6A to 8.

Here, the display timing set in advance is, for example, a display timing of a character caption which is overlapped with the moving images. The display timing is controlled by information which is, for example, inserted in the subtitle PES included in the broadcasting waves. In addition, for example, when the subtitle mode (subtitle mode (413) shown in FIG. 5) is set, the foremost character information is updated using a display position on the screen and a display timing which is specified at the broadcasting station. In addition, for example, when the capture mode (capture mode (412) shown in FIG. 5) is set, the foremost character information is displayed continuously until the next character is captured.

In addition, the UC mode is a character information display mode where the foremost character information is updated based on a user operation. That is, when the UC mode is set, different to the normal mode, the foremost character information is not updated in real time even in a case where new character information is provided from the broadcasting station. For example, in a case where the UC mode is set based on the user information, the display state is maintained during the setting operation. Then, every time an operation of updating the foremost character information is performed (for example, an operation of pressing the up button 204 and the down button 205 on the remote control 200), the foremost character information is updated. Here, a display example of the UC mode will be described in detail with reference to FIG. 9.

Content Example of Character Information Holding Section

Figure 3A:
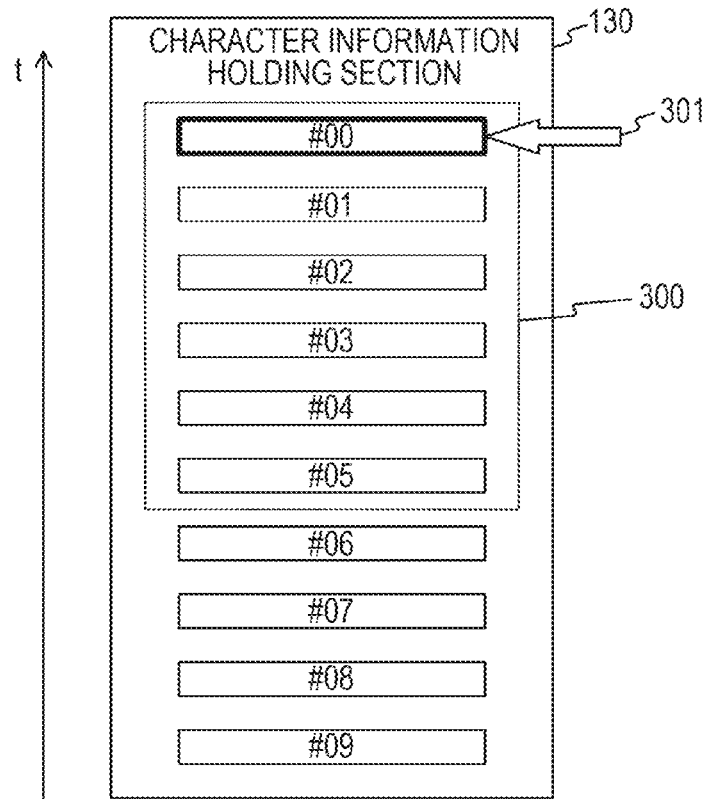
FIGS. 3A and 3B are diagrams schematically illustrating content held in a character information holding section according to the first embodiment of the present disclosure.
Figure 3B:
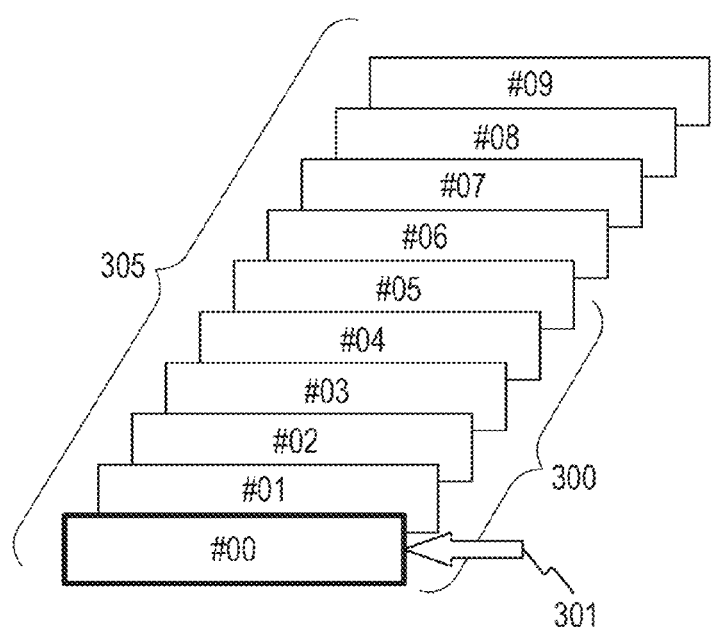

FIGS. 3A and 3B are diagrams schematically illustrating content held in the character information holding section 130 according to the first embodiment of the present disclosure. In FIG. 3A, a state where the character information is held by the character information holding section 130 is shown so as to be lined up in an up and down direction in a time line. In FIG. 3B, the character information is held by the character information holding section 130 is shown so as to be lined up in a diagonal direction in a time line.

In the character information holding section 130, out of the character information which is acquired using the character information acquisition section 120, a predetermined number of items of character information are held. Here, in FIGS. 3A and 3B, for ease of description, an example is shown where the number of character information which is the holding target (character information holding section possible holding number 305) is ten. In addition, in FIGS. 3A and 3B, there is a description where an identification number (#00 to #09) is attached in a rectangle which represents the character information lined up in a time line. That is, on the time axis, character information #00 is the newest character information and character information #09 is the oldest character information.

Here, the character information which is the display target out of the character information which is held in the character information holding section 130 is shown so as to be surrounded by a rectangle with a dotted line as a display target character information 300. In addition, a foremost pointer 301 is attached to the character information which is disposed in front out of the display target character information 300.

FIG. 4 is a diagram illustrating character information, which is a holding target of the character information holding section 130 according to the first embodiment of the present disclosure, in a time line in a simplified manner. That is, in FIG. 4, ten items of character information 431 to 440 which is the holding target of the character information holding section 130 are shown to be lined up in a time line. In addition, in FIG. 4, an item of character information 441 which is newly acquired (indicated by an arrow 302) is shown to be lined up in the time line. Here, characters which correspond to the character information 431 to 440 (for ease of description, a simplified string of characters) are shown as attached in the rectangles which respectively correspond to the character information 431 to 440 shown in FIG. 4. Here, the strings of characters which correspond to the character information are determined at the broadcasting station in a case where, for example, the character information (subtitle information) is acquired by being extracted from the subtitle PES. In addition, the character information 431 to 440 corresponds to the character information #00 to #09 shown in FIGS. 3A and 3B.

Example of Selecting Character Information Display Mode

Figure 5:
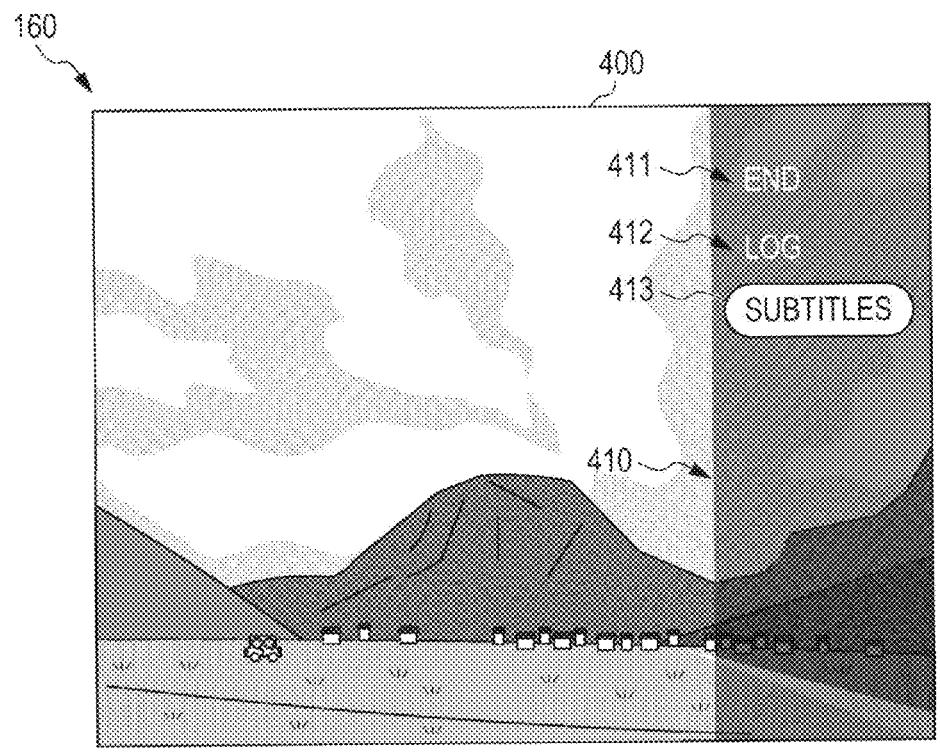
FIG. 5 is a diagram illustrating a menu screen example displayed in a display section according to the first embodiment of the present disclosure.

FIG. 5 is a diagram illustrating a menu screen example displayed in the display section 160 according to the first embodiment of the present disclosure. In FIG. 5, in a case where an image 400 based on broadcasting waves is displayed in the display section 160, a case where a menu screen 410 is displayed to overlap on the image 400 is described as an example. In FIG. 5, an example is shown where either a capture mode, where characters which are included in a display target image are captured and the characters are displayed as the character information, and a subtitle mode, where the subtitle information which is linked to the display target information is displayed as the character information, is selected as the character information display mode.

The menu screen 410 is displayed according to, for example, the pressing of a predetermined button in the arrow determination button grouping 203 on the remote control 200. In addition, an "end" selection region 411, a "capture" selection region 412, and a "subtitles" selection region 413 are provided in the menu screen 410. With regard to each of the regions, for example, it is possible to select a predetermined region using an operation of pressing the up button 204 or the down button 205 of the arrow determination button grouping 203 on the remote control 200. In addition, it is possible to perform a confirm operation (operation for setting the character information display mode) using the pressing of the confirm button 206 in a state where the predetermined region is selected (for example, in a state of being surrounded by a white elliptical shape).

The "end" selection region 411 is a region selected in a case where the setting of the character information display mode is removed.

The "capture" selection region 412 is a region selected in a case where the capture mode is selected.

The "subtitles" selection region 413 is a region selected in a case where the subtitle mode is selected. Here, in the first embodiment of the present disclosure, a case where the subtitle mode is mainly set as the character information display mode will be described as an example.

Example of Displaying Character Information

Figure 6A:
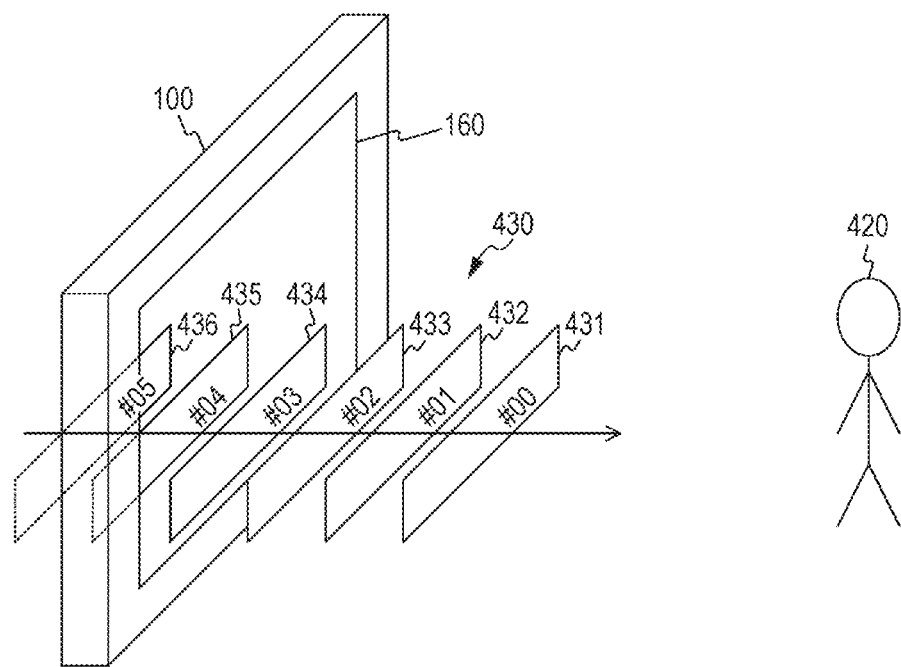
FIGS. 6A and 6B are diagrams illustrating a relationship between the display section and a virtual display position of character information which is displayed in the display section according to the first embodiment of the present disclosure.
Figure 6B:
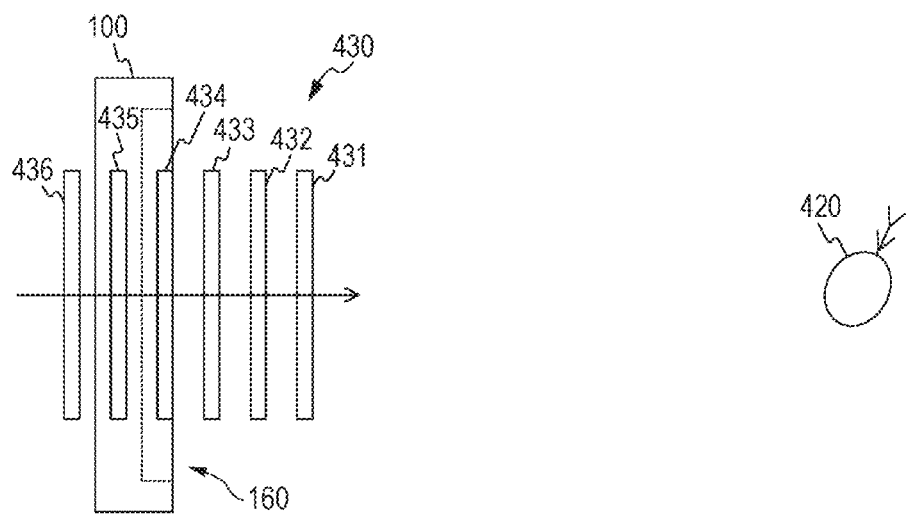

FIGS. 6A and 6B are diagrams illustrating a relationship between the display section 160 and a virtual display position of the character information which is displayed in the display section 160 according to the first embodiment of the present disclosure.

FIG. 6A schematically illustrates a perspective diagram in a case where the positions of the character information 431 to 436 (a character information grouping 430) which are able to be viewed virtually in a stereoscopic manner by a viewer (user) 420 are arranged in the depth direction when the character information 431 to 436 is displayed on the display section 160. FIG. 6B schematically illustrates an upper-plane diagram in a case where the positions of the character information 431 to 436 are virtually arranged in the depth direction in a state shown in FIG. 6A. Here, the character information 431 to 436 corresponds to the character information 431 to 436 shown in FIG. 4 (the character information #00 to #05 shown in FIGS. 3A and 3B).

Here, the depth direction shown by the arrow (viewing direction) is a direction which, for example, is parallel to a line which connects the view (user) 420 and the display surface of the display section 160 and is a direction which goes straight through (or substantially straight through) the display surface of the display section 160. Here, a display example in the case of viewing from the front side is shown in FIGS. 7A and 7B.

FIGS. 7A and 7B are diagrams illustrating a display example of the character information displayed in the display section 160 according to the first embodiment of the present disclosure.

FIG. 7A illustrates a display example of the character information 431 to 436 (the character information grouping 430) in a case where an image 451 is displayed on the display section 160. The image 451 is, for example, an image where the expanses of Hokkaido in winter are imaged. In addition, "winter visits Hokkaido" is displayed at the front as the character information 431 which is related to the image 451. That is, FIG. 7A illustrates a display example in a case where the holding state of the character information holding section 130 is a state shown in FIG. 4.

In addition, in the first embodiment of the present disclosure, it is easy for the user to grasp that there is the character information which is positioned previously on the time axis (old character information) by changing the a value of each item of the character information which configures the character information grouping 430. Here, there is a concern that the characters which are included in the character information may become difficult to see in a case where the α value of the entire region of the character information. Therefore, in the first embodiment of the present disclosure, only the α value of a region other than a character region of the character information (that is, the background image) is changed and the α value of the character region is not changed.

Here, the α value is a numerical value which expresses the transparency and is changed within a range where the transparency of RGB (Red, Green, and Blue) is zero to one. For example, the target image is not transparent in a case where α is set to equal zero and the transparency of the target image increases in accordance with the numerical value increasing. Then, the target image is completely transparent in a case where α is set to equal one. That is, it is possible to change to a predetermined degree of transparency by changing the a value in a case of changing the transparency of the image.

Specifically, the α value of the background region of the character information 431 which is in the front is set to be the highest and the α value of the background region of the character information 436 which is in the rear is set to be the lowest. For example, the display control section 150 sets the α value of the background region of the character information 431 to be α=a (0<a<1), sets the α value of the background region of the character information 432 to be α=b (0<b<a), and sets the α value of the background region of the character information 433 to be α=c (0<c<b). In addition, the display control section 150 sets the α value of the background region of the character information 434 to be α=d (0<d<c), sets the α value of the background region of the character information 435 to be α=e (0<e<d), and sets the α value of the background region of the character information 436 to be α=f (f=0).

In addition, the display control section 150 changes the sizes of the rectangles which correspond to the character information 431 to 436 according to the time axis. Specifically, with the size of the rectangle which corresponds to the character information 431 which is in the front as a standard, the sizes of the rectangles which correspond to the prior character information 432 to 436 are reduced by a predetermined proportion on the time axis.

Then, the display control section 150 overwrites and combines the character information 431 to 436 where the α value of the background region has been changed from the character information 436 which is in the rear to the character information 431 which is in the front. By changing the α value of the background region of each item of the character information and combining in this manner, as shown in FIG. 7A, the user is easily able to grasp that there is the prior character information 432, 433, and the like on the time axis in the background region of the character information 431 which is in the front. Here, in this example, an example is shown where the α values are changed for the background regions, other than that for the character information 436 which is in the rear, out of the display target character information. Here, as the character information after the foremost character information on the time axis, even though the user is able to see the plurality of character information, it is assumed that the later half portion is difficult for the user to see. Therefore, only the α values of the background regions of the foremost character information and a predetermined number (for example, three) of items of the character information, which are continuous with the foremost character information, may be changed (that is, 0<α) and the α values of the background regions with regard to the other items of character information may not be changed (that is, α=0).

In FIG. 7B, a display example of the character information 441 and 431 to 435 (character information grouping 460) is shown of a case where an image 452 is displayed in the display section 160. The image 452 is, for example, an image where a ski field in Hokkaido is imaged. In addition, "ski field crowded with skiers" is displayed at the front as the character information 441 which is related to the image 452.

That is, in FIG. 7B, a display example is shown of a case where, from the state shown in FIG. 7A, new character information "ski field crowded with skiers" is acquired and held in the character information holding section 130. That is, in FIG. 7B, a display example is shown of a case where the state is changed from a holding state of the character information holding section 130 shown in FIG. 4 so that the new character information 441 "ski field crowded with skiers" is added and the oldest character information 440 "meat fair opens in Sapporo" is deleted. In this case, as shown in FIG. 7B, each item of the character information 431 to 435 shown in FIG. 7A is moved to the rear in the depth direction and the oldest character information 436 shown in FIG. 7A is deleted.

In this manner, in a case where the new character information 441 "ski field crowded with skiers" is newly held in the character information holding section 130, the oldest character information 440 "meat fair opens in Sapporo" is deleted from the character information holding section 130. In this case, each item of the character information is displayed to be changed so as to move one to the rear in the depth direction (that is, progresses to the side opposite to the viewer) even for the character information which is the display target. Here, a transition example of the character information will be shown in FIG. 8.

In a case where the images 451 and 452 are displayed in the display section 160 in this manner, it is easy for the user to grasp the content of the images 451 and 452 which are displayed through the displaying of the character information 431 and 441 which are linked to the images 451 and 452. In addition, by displaying the past character information so as to be arranged to line up from the newest character information in the depth direction, it is possible for the user to easily grasp that it is possible to see the past character information. In addition, it is possible for the user to recognize even the past character information by the background regions of the foremost character information and the predetermined number of character information which are continuous with the foremost character information being made to be semi-transparent to the extent that it is possible to read the characters in the front.

FIG. 8 is a diagram illustrating a transition example of the character information displayed in the display section 160 according to the first embodiment of the present disclosure. Here, FIG. 8 illustrates a transition example of the character information when the normal mode is set.

In (a) of FIG. 8, a display example (character information grouping 471) is shown of a case in the character information holding section 130 where the character information 434 "ice floe in Sea of Okhotsk" is held in the character information holding section 130 as the newest character information.

In (b) of FIG. 8, a display example (character information grouping 472) is shown of a case where the new character information 433 "mountains before snow (one month beforehand)" is added in the character information holding section 130 from a state shown in (a) of FIG. 8.

In (c) of FIG. 8, a display example (character information grouping 473) is shown of a case where the new character information 432 "snow-capped mountains (today)" is added in the character information holding section 130 from a state shown in (b) of FIG. 8.

In (d) of FIG. 8, a display example (the character information grouping 430) is shown of a case where the new character information 431 "winter visits Hokkaido" is added in the character information holding section 130 from a state shown in (c) of FIG. 8. Here, (d) of FIG. 8 is the same as the display example (the character information grouping 430) shown in FIG. 7A.

In this manner, in a case where the normal mode is set, the character information which is displayed in the display section 160 is sequentially updated each time new character information is acquired by the character information acquisition section 120 and added to the character information holding section 130.

That is, the newest character information is arranged as the foremost character information and the past character information is arranged in a time line in the rear of the newest character information in the depth direction. In addition, when the newest character information is acquired and plotted as the foremost character information, the character information which is older than the newest character information is moved to the rear in the depth direction.

Here, for example, a case is assumed where the foremost character information which is displayed in the display section 160 is switched from the character information 431 shown in FIG. 7A to the character information 441 shown in FIG. 7B. In this case, for example, it is assumed that the user missed out on viewing the character information 431 in the display state shown in FIG. 7A. In a case such as this, it is assumed that the user desires that the character information 431 is displayed even in a case where the new image 452 is displayed in the display section 160. Therefore, below, an example is shown where the character information is changed based on a user operation.

Display Transition Example of Subtitle Information Based on User Operation

Figure 9:
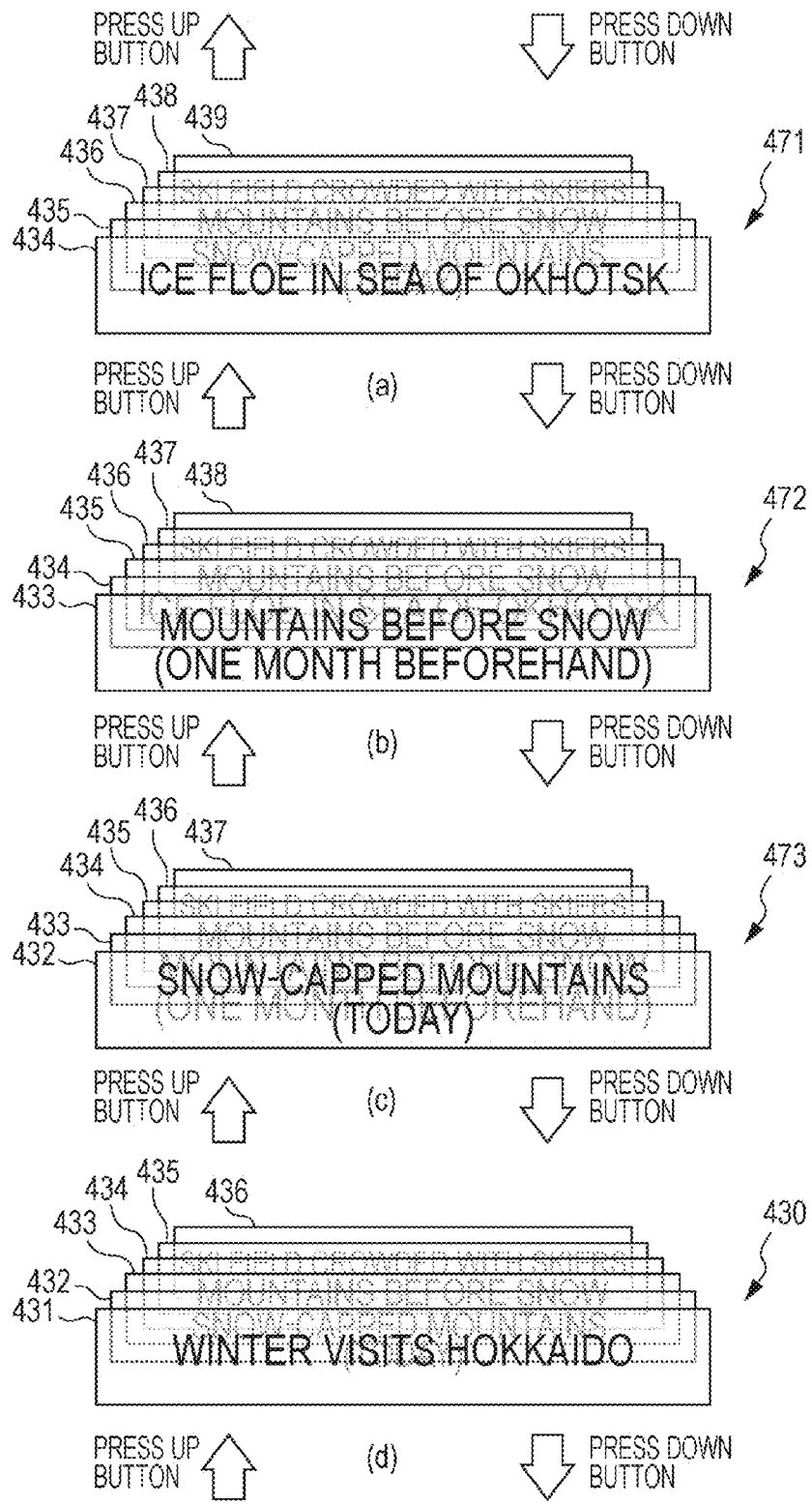
FIG. 9 is a diagram illustrating a transition example of character information displayed in the display section according to the first embodiment of the present disclosure.

FIG. 9 is a diagram illustrating a transition example of the character information displayed in the display section 160 according to the first embodiment of the present disclosure. Here, in FIG. 9, a transition example of the character information is shown when the UC mode is set. That is, in (a) to (d) in FIG. 9, a display transition example is shown when the up button 204 or the down button 205 on the remote control 200 are pressed in a case where each item of character information shown in FIG. 4 is displayed. Here, each item of character information shown in (a) to (d) in FIG. 9 corresponds to each item of character information shown in (a) to (d) in FIG. 8.

Here, in a case where the UC mode is set, it is possible to display the character information based on a user operation without any relationship with the image which is displayed in the display section 160 (the image based on the broadcasting waves). As a result, different to the example shown in FIG. 8, it is possible to display the same character information for a time which is desired by a user. For example, it is possible to display the character information grouping 430 shown in (d) of FIG. 9 for a certain period of time if an operation of pressing the up button 204 or the down button 205 on the remote control 200 is performed in a state where the character information grouping 471 shown in (a) of FIG. 9 is displayed.

In addition, it is possible to display again even with regard to the past character information on the time axis. For example, it is possible to display the character information grouping 471 shown in (a) of FIG. 9 by performing an operation of pressing the down button 205 on the remote control 200 in a state where the character information grouping 472 shown in (b) of FIG. 9 is displayed. That is, the foremost pointer 301 shown in FIG. 4 moves along the time axis in accordance with the operation of pressing the up button 204 or the down button 205 on the remote control 200.

That is, the operation reception section 190 receives a first operation (the operation of pressing the down button 205) or a second operation (the operation of pressing the up button 204) via the remote control 200. Here, the first operation is an operation for setting one out of two items of character information (the new one of the two items of character information) which are adjacent to the earliest character information (the foremost character information) on the time axis as the new earliest character information. In addition, the second operation is an operation for setting the other out of the two items of character information (the old one of the two items of character information) as the new earliest character information. Then, the control section 140 performs a change of either of the two items of character information to the new earliest character information based on the user operation (the first operation or the second operation) which is received by the operation reception section 190.

Specifically, the control section 140 performs a control where the new earliest character information is displayed on the display section 160 adjacent to the earliest character information when the first operation was received in a case where the first operation was received. In addition, the control section 140 performs a control where the new earliest character information is displayed on the display section 160 by deleting the earliest character information when the second operation was received in a case where the second operation was received.

Here, as shown in FIG. 4 and the like, the region for holding the character information in the character information holding section 130 is limited. As a result, it is possible to display the past character information by going back just the number which is able to be held in the character information holding section 130.

In addition, when the UC mode is set, in a case where an updating process (for example, the operation of pressing the up button 204 or the down button 205 on the remote control 200) is not able to be performed by the user, the character information is not updated as described above. However, a case is also assumed where the character information is frequently acquired from the broadcasting station without the updating process by the user having been performed for a long time. In this case, the holding region in the character information holding section 130 is exhausted and holding more than this is not possible. As a result, the oldest character information of the character information which is held is deleted irrespective of the user operation. When this deletion operation is repeatedly performed, the character information which is displayed as the foremost character information is the final deletion target when the UC mode is set. In a case where the character information is deleted, there is a display such that the foremost character information is updated and plotting is performed with the oldest character information out of the character information which is held as the foremost character information. In addition, in a case where the deletion action is performed, the user may be notified by that the deletion action has been performed (for example, that it is not possible to go back to the past character information further than this) being displayed.

In addition, in a case where certain conditions are satisfied, all of the character information which is held in the character information holding section 130 may be deleted irrespective of the user operation. The case where the certain conditions are satisfied is, for example, cases where selection of another channel by the user operation, switching input to an external input, or the like is performed. In this case, it is possible to delete all of the character information which is held in the character information holding section 130 since it is not possible to view the content (event) which the user was viewing.

In addition, the case where certain conditions are satisfied is, for example, a case where the content (event) has ended. The end of the content is able to be determined by referencing program information of the broadcasting. For example, in a case where a program which has a sequenced time slot (from 20:00 to 20:54) is defined by the broadcasting station, it is possible to delete all of the character information related to the program when it is the end timing (20:54) (or after a certain period of time has passed since the end).

In this manner, in a case where all of the character information which is held in the character information holding section 130 is deleted, a new holding operation of character information which relates to a following program starts.

In addition, when all of the character information which is held in the character information holding section 130 is deleted, in a case where the UC mode is set, the setting of the UC mode may be mandatorily removed and the normal mode may be set.

Example of Operation of Information Processing Device

Next, the operation of the information process device 100 according to the embodiment described above will be described with reference to the diagrams.

Figure 10:
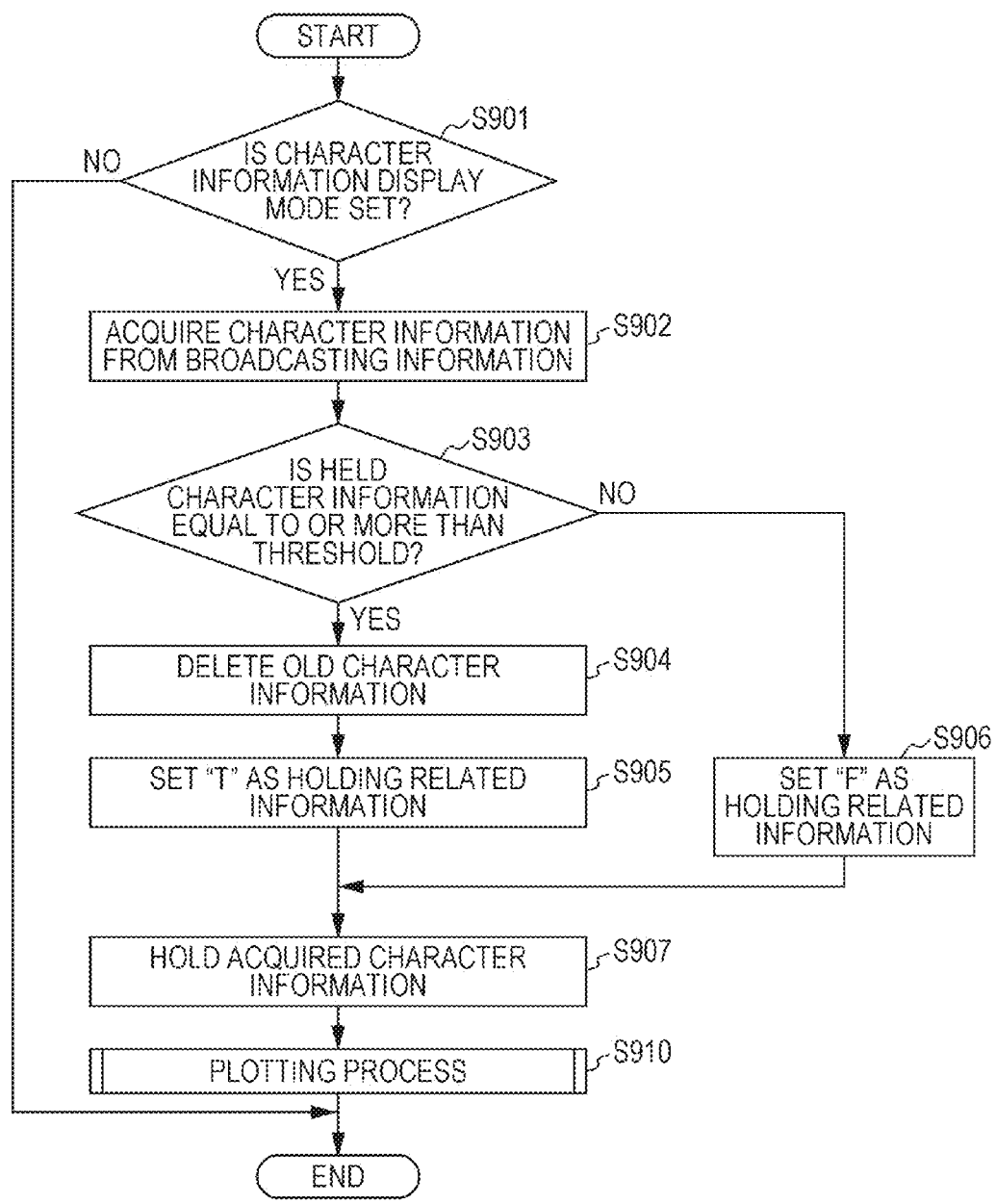
FIG. 10 is a flowchart illustrating one example of a process sequence of a character information display process using an information process device according to the first embodiment of the present disclosure.

FIG. 10 is a flowchart illustrating one example of a process sequence of a character information display process using the information process device 100 according to the first embodiment of the present disclosure.

First, it is determined whether or not the character information display mode is set (step S901) and in a case where it is determined that the character information display mode is not set, the operation of the character information display process ends. On the other hand, in a case where the character information display mode is set (step S901), the character information acquisition section 120 acquires the character information which is included in the broadcasting waves (step S902).

Next, it is determined whether or not the number of items of character information which are held in the character information holding section 130 is equal to or more than a threshold (step S903). Then, in a case where the number of items of character information which are held in the character information holding section 130 is equal to or more than the threshold (step S903), the character information acquisition section 120 deletes the oldest character information out of the character information which are held in the character information holding section 130 (step S904). Next, "T(True)" is set as holding related information (step S905).

On the other hand, in a case where the number of items of character information which are held in the character information holding section 130 is less than the threshold (step S903), "F(False)" is set as holding related information (step S906).

Next, after "T" or "F" are set as the holding related information (steps S905 or S906), the character information which is acquired by the character information acquisition section 120 is held in the character information holding section 130 as the newest character information (step S907).

Next, a plotting process is performed using the character information which is held in the character information holding section 130 (step S910). The plotting process will be described in detail with reference to FIG. 11. Here, step S910 is an example of a display sequence according to the scope of the disclosure.

Figure 11:
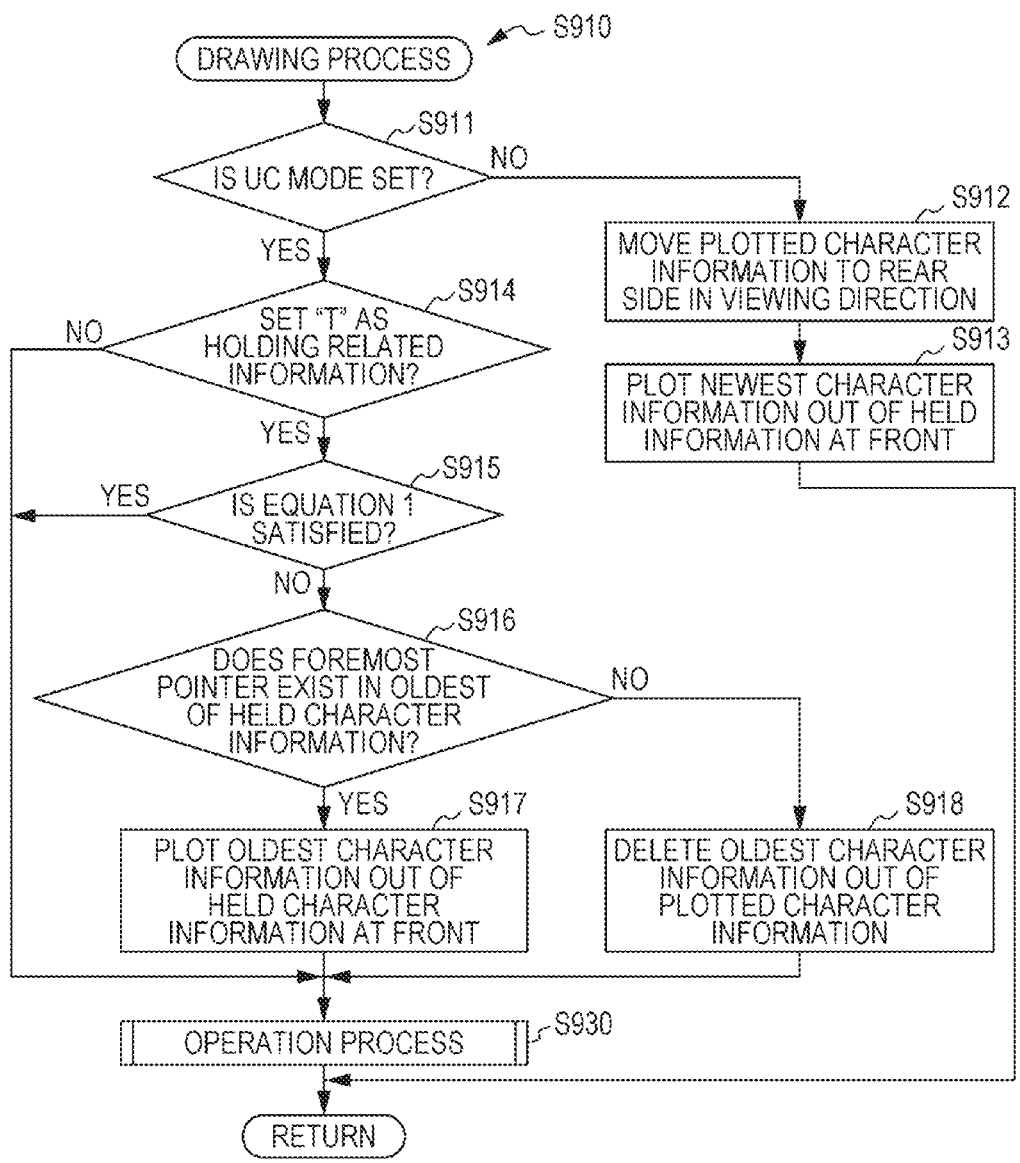
FIG. 11 is a flowchart illustrating one example of a plotting process sequence out of the process sequence of the character information display process using the information process device according to the first embodiment of the present disclosure.

FIG. 11 is a flowchart illustrating one example of a plotting process sequence (a process sequence of step S910 shown in FIG. 10) out of the process sequence of the character information display process using the information process device 100 according to the first embodiment of the present disclosure.

First, it is determined whether or not the UC mode is set (step S911). In a case where the UC mode is not set (that is, in a case where the user mode is set) (step S911), the display control section 150 moves the plotted character information one to the rear in the depth direction (step S912). Next, the display control section 150 plots in front the newest character information (that is, the character information which was acquired immediately beforehand) out of the character information which is held in the character information holding section 130 (step S913) and the operation of the plotting process ends.

In addition, in a case where the UC mode is set (step S911), it is determined whether or not "T" is set as the holding related information (step S914). In a case where "T" is not set as the holding related information (that is, in a case where "F" is set as the holding related information) (step S914), the operation proceeds to step S930. On the other hand, in a case where "T" is set as the holding related information (step S914), it is determined whether or not the following equation 1 is satisfied (step S915), and in a case where equation 1 is satisfied, the operation proceeds to step S930.

$$CM1 - FP1 \geq IO1 - 1 \qquad \text{equation 1}$$

Here, CM1 is a value indicating a number of items of character information which are able to be held in the character information holding section 130. In addition, FP1 is a value indicating the position of the foremost pointer 301 (a value indicating a number of items of character information from the newest character information to the foremost pointer 301). In addition, IO1 is a value indicating the number of items of display target character information.

In a case where equation 1 is not satisfied (step S915), it is determined whether or not the foremost pointer 301 exists at the oldest character information which is held in the character information holding section 130 (step S916). That is, it is determined whether or not CM1=FP1 (step S916).

In a case where the foremost pointer 301 exists at the oldest character information (step S916), the display control section 150 plots in front the oldest character information out of the character information which is held in the character information holding section 130 (step S917). In this case, only the oldest character information is displayed as the display target character information. In addition, the foremost pointer 301 is attached to the oldest character information which is the display target. Next, an operation process is performed (step S930). The operation process will be described in detail with reference to FIG. 12. Here, step S930 is an example of a control sequence according to the scope of the disclosure.

In a case where the foremost pointer 301 does not exist at the oldest character information (step S916), the display control section 150 deletes the oldest character information out of the display target information (step S918). Due to this, the plotting position of the character information in the rear is set one forward. Here, in a case where the character information is deleted in this manner, the deletion of the character information is performed using an effect of effects.

Figure 12:
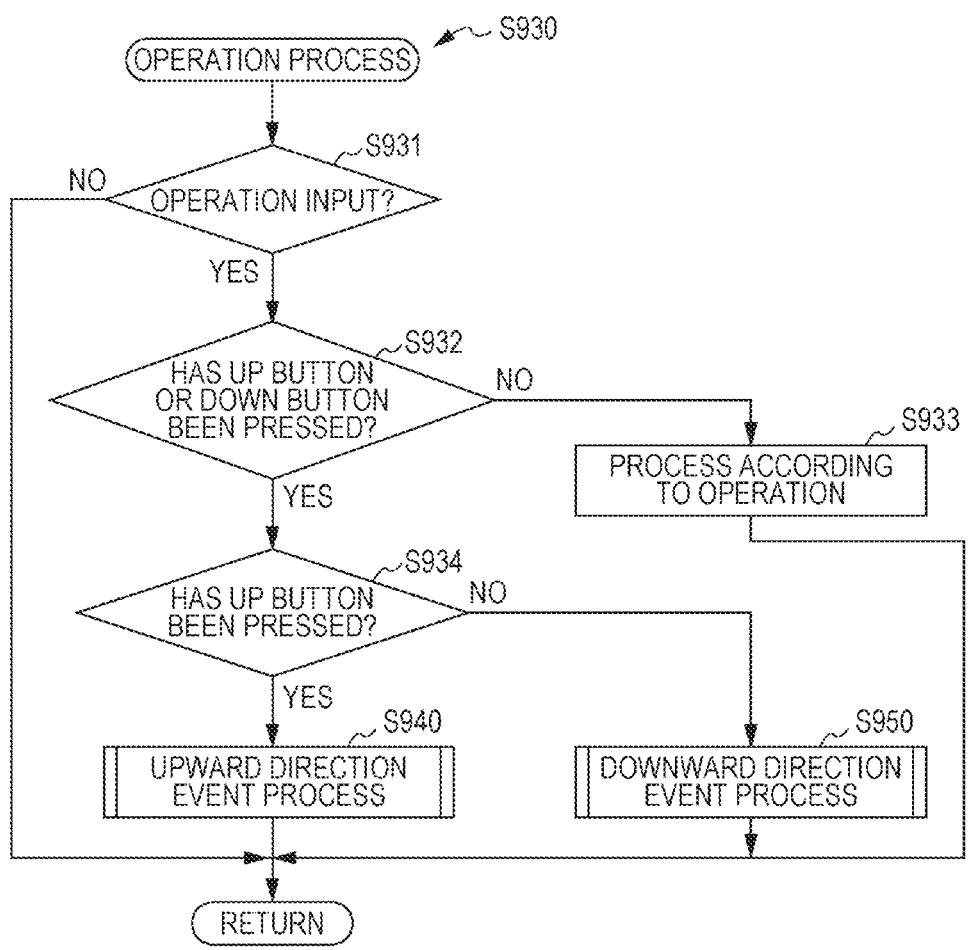
FIG. 12 is a flowchart illustrating one example of an operation process sequence out of the process sequence of the character information display process using the information process device according to the first embodiment of the present disclosure.

FIG. 12 is a flowchart illustrating one example of an operation process sequence (a process sequence of step S930 shown in FIG. 11) out of the process sequence of the character information display process using the information process device 100 according to the first embodiment of the present disclosure.

First, it is determined whether or not an operation input in the remote control 200 (or an operation input in the operation reception section 190 in the information processing device 100) is performed (step S931) and in a case where the input operation is not performed, the operation of the operation process ends.

In a case where the operation input is performed (step S931), it is determined whether or not the operation is the operation of pressing the up button 204 or the down button 205 on the remote control 200 (step S932). In a case where the operation is not the operation of pressing the up button 204 or the down button 205 (step S932), a process is performed according to the operation (step S933) and the operation of the operation process ends.

On the other hand, in a case where the operation is the operation of pressing the up button 204 or the down button 205 (step S932), it is determined whether or not the pressing operation is the operation of pressing the up button 204 (step S934). In the case where the pressing operation is the operation of pressing the up button 204 (step S934), an upward direction event process is performed (step S940). The upward direction event process will be described in detail with reference to FIG. 13. In addition, in the case where the pressing operation is the operation of pressing the down button 205 (step S934), a downward direction event process is performed (step S950). The upward direction event process will be described in detail with reference to FIG. 14.

Figure 13:
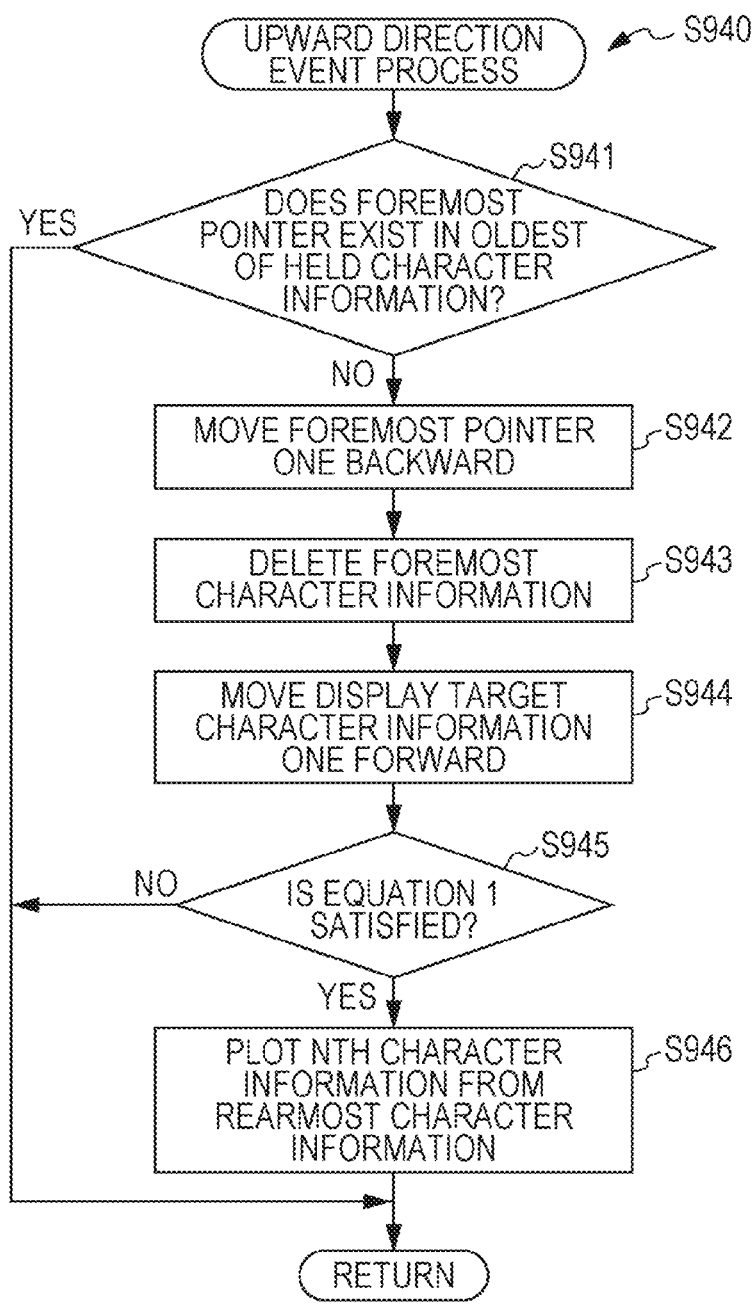
FIG. 13 is a flowchart illustrating one example of an upward direction event process sequence out of the process sequence of the character information display process using the information process device according to the first embodiment of the present disclosure.

FIG. 13 is a flowchart illustrating one example of an upward direction event process sequence (a process sequence of step S940 shown in FIG. 12) out of the process sequence of the character information display process using the information process device 100 according to the first embodiment of the present disclosure.

First, it is determined whether or not the foremost pointer 301 exists at the oldest character information which is held in the character information holding section 130 (step S941), and in a case where the foremost pointer 301 exists at the oldest character information, the operation of the upward direction event process ends. In this case, since the foremost character information is the oldest character information, that the process according to the operation of the up button 204 is not possible may be displayed.

On the other hand, in a case where the foremost pointer 301 does not exist at the oldest character information (step S941), the display control section 150 moves the foremost pointer 301 one backward (forward on the time axis) (step S942). Next, the display control section 150 deletes the character information which is plotted in front (step S943).

Next, the display control section 150 moves each item of the display target character information one forward (step S944). Next, it is determined whether or not equation 1 is satisfied (step S945), and in a case where equation 1 is not satisfied, the operation of the upward direction event process ends. On the other hand, in a case where equation 1 is satisfied (step S945), the display control section 150 plots the Nth (IO1-1th) character information from the plotting position of the character information in the rear (step S946), that is, plots the character information in the front. Here, IO1 is the same as equation 1.

Figure 14:
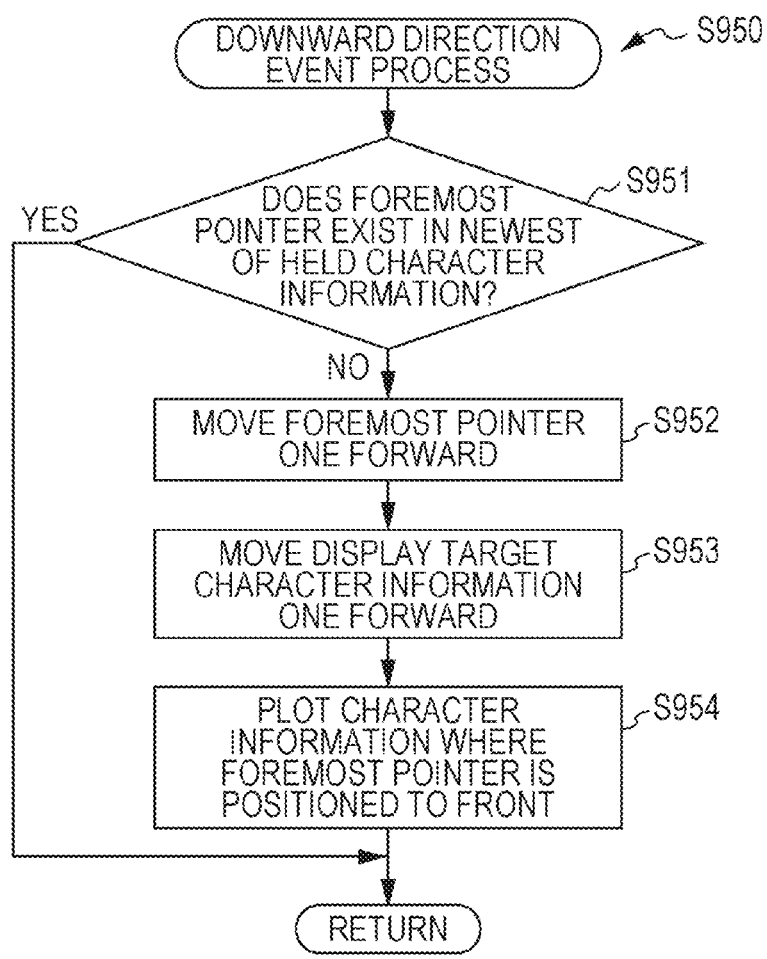
FIG. 14 is a flowchart illustrating one example of an downward direction event process sequence out of the process sequence of the character information display process using the information process device according to the first embodiment of the present disclosure.

FIG. 14 is a flowchart illustrating one example of an downward direction event process sequence (a process sequence of step S950 shown in FIG. 12) out of the process sequence of the character information display process using the information process device 100 according to the first embodiment of the present disclosure.

First, it is determined whether or not the character information in the front is the newest character information which is held in the character information holding section 130 (step S951), and in a case where the character information in the front is the newest character information, the operation of the downward direction event process ends. In this case, since the foremost character information is the newest character information, that the process according to the operation of the down button 205 is not possible may be displayed.

On the other hand, in a case where the character information in the front is not the newest character information (step S951), the display control section 150 moves the foremost pointer 301 one forward (backward on the time axis) (step S952) and moves each item of the display target character information one backward (step S953). In this case, the oldest character information out of the plotted character information is deleted.

Next, the display control section 150 plots in front the character information where the foremost pointer 301 exists (step S954).

Example of Changing Display State According to Mode

Below, an example is shown where the display position of the character information is fixed (for example, the display position of the foremost character information) in a case where the character information display mode (the normal mode or the UC mode) is set. Here, for example, the display state of the character information may be changed according to the mode which is set so that it is possible to the user to visually grasp the mode which has been set.

For example, it is possible that the color of a background region of the character information when the normal mode is set and the color of a background region of the character information when the UC mode is set are different. For example, it is possible to set the color of the background region of the character information as pale blue when the normal mode is set and to set the color of the background region of the character information as pale red when the UC mode is set.

In addition, for example, it is possible that the color of the frame of the rectangle which corresponds to the character information when the normal mode is set and the color of the frame of the rectangle which corresponds to the character information when the UC mode is set are different.

In addition, for example, it is possible that the shape (or the size) of the region which corresponds to the character information when the normal mode is set and the shape (or the size) of the region which corresponds to the character information when the UC mode is set are different.

In addition, for example, it is possible that the display position of the character information when the normal mode is set and the display position of the character information when the UC mode is set are different. This example will be shown in FIGS. 15A to 16B.

Figure 15A:
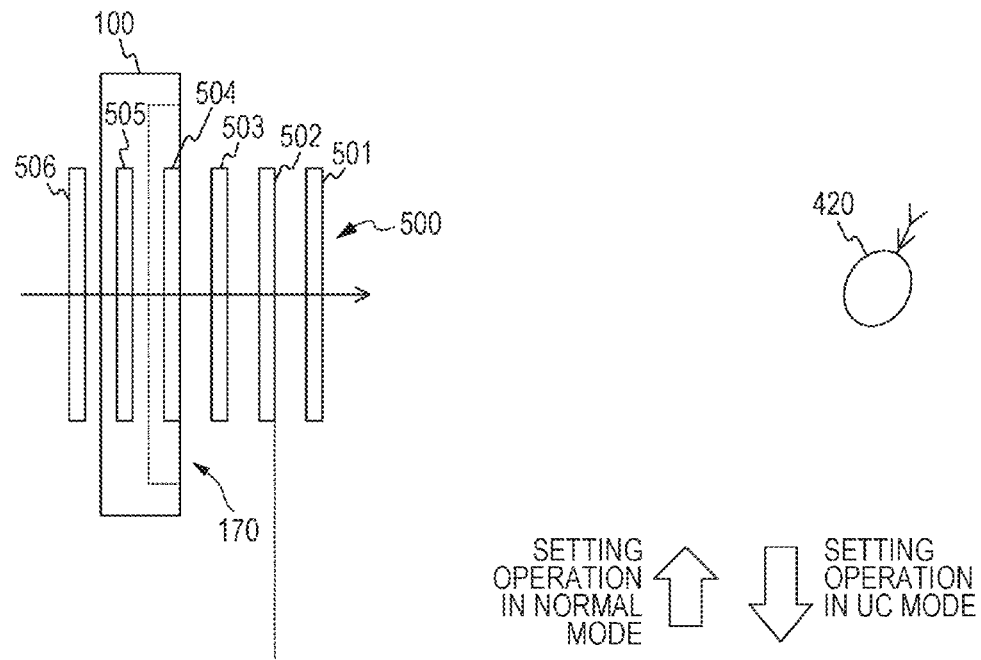
FIGS. 15A and 15B are diagrams illustrating an example of a change in a display state of character information in a case where a character information display mode is set in the information process device according to the first embodiment of the present disclosure.
Figure 15B:
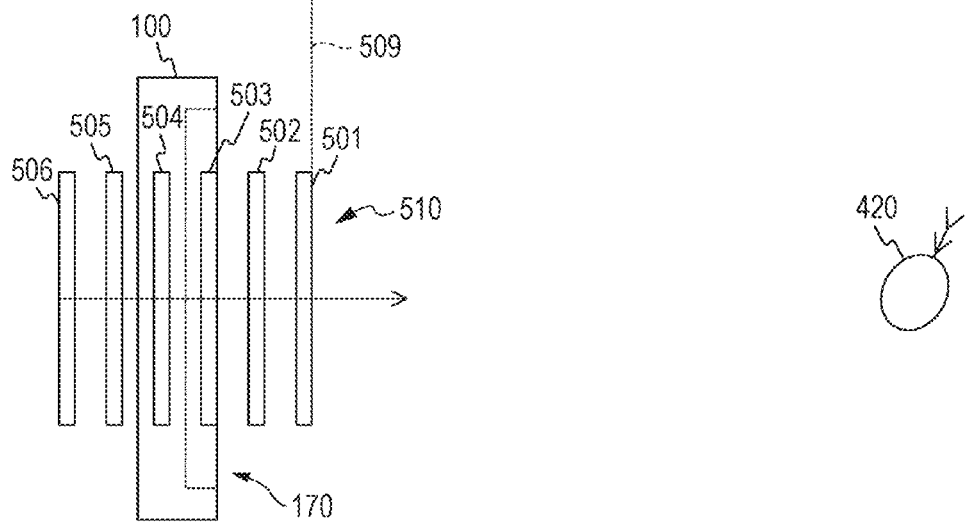
Figure 16A:
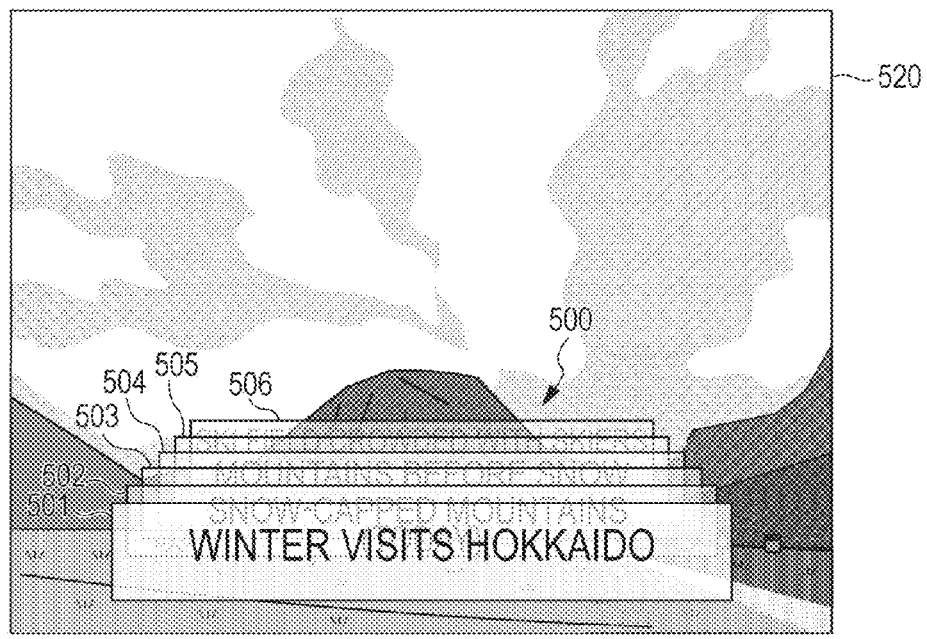
FIGS. 16A and 16B are diagrams illustrating an example of a change in a display state of character information in a case where a character information display mode is set in the information process device according to the first embodiment of the present disclosure.
Figure 16B:
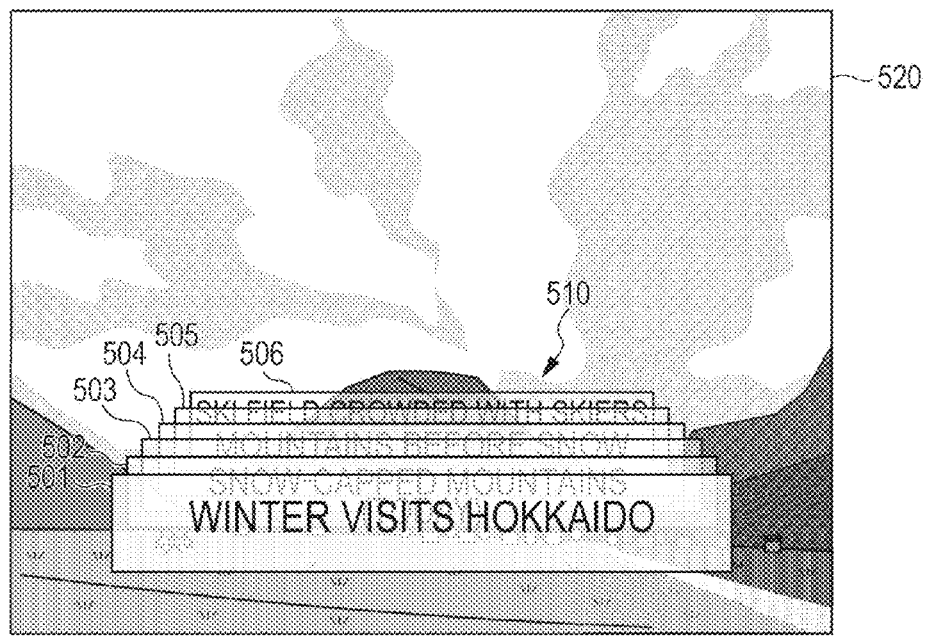

FIGS. 15A to 16B are diagrams illustrating an example of a change in a display state of the character information in a case where the character information display mode is set in the information process device 100 according to the first embodiment of the present disclosure. That is, FIGS. 15A and 15B schematically illustrate an upper-plane diagram in a case where the positions of the character information 501 to 506 are virtually arranged in the depth direction, and FIGS. 16A and 16B illustrate an example of the character information displayed in the display section 160. In addition, in FIGS. 15A and 16A, an example of a display state of the character information is shown when the normal mode is set and, in FIGS. 15B and 16B, an example of a display state of the character information is shown when the UC mode is set.

Here, the display state of the character information shown in FIGS. 15A and 16A is the same display state. For example, the UC mode is set in a case where an operation of pressing the mode switching button 209 on the remote control 200 is performed in a state shown in FIGS. 15A and 16A (in a state where the normal mode is set). That is, switching from the normal mode to the UC mode is performed. In addition, in a case where an operation of switching the character information display mode is performed in this manner, the display position of the character information changes. For example, as shown by a dotted line 509, the character information 501 to 506 moves to the rear in the depth direction. In a case where the display position is changed in this manner, it is possible for the user to see that the character information 501 to 506 has moved to the rear in the depth direction as shown in FIG. 16B. Due to this, the user is easily able to visually grasp that the switching of the modes has been performed. In addition, the user is easily able to visually grasp whether the current mode is the normal mode where an operation of changing the character information is not possible and the UC mode where an operation of changing the character information is possible.

In addition, for example, the normal mode is set in a case where the operation of pressing the mode switching button 209 on the remote control 200 is performed in a state shown in FIGS. 15B and 16B (a state where the UC mode is set). That is, switching from the UC mode to the normal mode is performed. In addition, in a case where an operation of switching the character information display mode is performed in this manner, the display position of the character information changes. With regard to this case, the opposite change is performed to the transition when switching from the normal mode to the UC mode.

That is, the operation reception section 190 receives the operation of switching the UC mode (the first mode) and the normal mode (the second mode) with regard to the character information which is the earliest character information (the foremost character information) via the remote control 200. In addition, the UC mode (the first mode) is a character information display mode where it is possible to perform a change based on the user operation with regard to the character information which is the earliest character information. In addition, the normal mode (the second mode) is a character information display mode where it is possible to perform a change according to the display of the moving images without changing based on the user operation with regard to the character information which is the earliest character information. Then, the control section 140 performs a control where the display state of the display target character information is changed when each of the modes is set (the first mode or the second mode) in a case where the operation for switching received by the operation reception section 190 is received. For example, the control section 140 changes the display state by changing the position of the earliest character information in the predetermined direction (the depth direction) when the first mode is set and the position of the earliest character information in the predetermined direction when the second mode is set.

In addition, the foremost character information may be moved in the depth direction according to the operation of pressing the up button 204 or the down button 205 on the remote control 200. For example, in a case where the operation of pressing the up button 204 on the remote control 200 is performed, the foremost character information and the other display target character information which is continuous with the foremost character information are moved to the rear in the depth direction. In addition, for example, in a case where the operation of pressing the down button 205 on the remote control 200 is performed, the foremost character information and the other display target character information which is continuous with the foremost character information are moved to the front in the depth direction. Due to this, the user is easily able to visually grasp that the operation of changing the character information has been performed.

2. Second Embodiment

In the first embodiment of the present disclosure, an example is shown where a planar image (for example, an image based on broadcasting waves) is displayed in the display section 160 and character information (a planar image) is overlapped on the planar image and displayed. Here, it is considered that it is further possible for a stereoscopic effect to be given by the character information which is displayed to overlap the planar image is displayed as a stereoscopic image. Therefore, in the second embodiment of the present disclosure, an example is shown where the character information is displayed as a stereoscopic image. Here, the configuration of the information processing device of the second embodiment of the present disclosure has substantially the same configuration as the example shown in FIG. 1. As a result, the portions which are common with the first embodiment of the present disclosure have the same reference numeral attached and a portion of the description thereof is omitted.

In addition, in the second embodiment of the present disclosure, it is possible to use a parallax barrier method or a specialized glasses method as an example of a display method for displaying the stereoscopic image in the display section 160. The specialized glasses method is a method of providing the stereoscopic image to a user by the user wearing specialized glasses for viewing stereoscopic images (for example, active shutter method glasses or polarized plate type glasses). Here, it is possible to apply the second embodiment of the present disclosure with regard to methods other than the parallax barrier method and the specialized glasses method.

Example of Relationship Between Stereoscopic Image and Position of Character Information Included in Stereoscopic Image in Depth Direction FIGS. 17A to 17D are diagrams illustrating a stereoscopic image for displaying the character information in a stereoscopic manner in the display section 160 according to the second embodiment of the present disclosure.

Figure 18A:
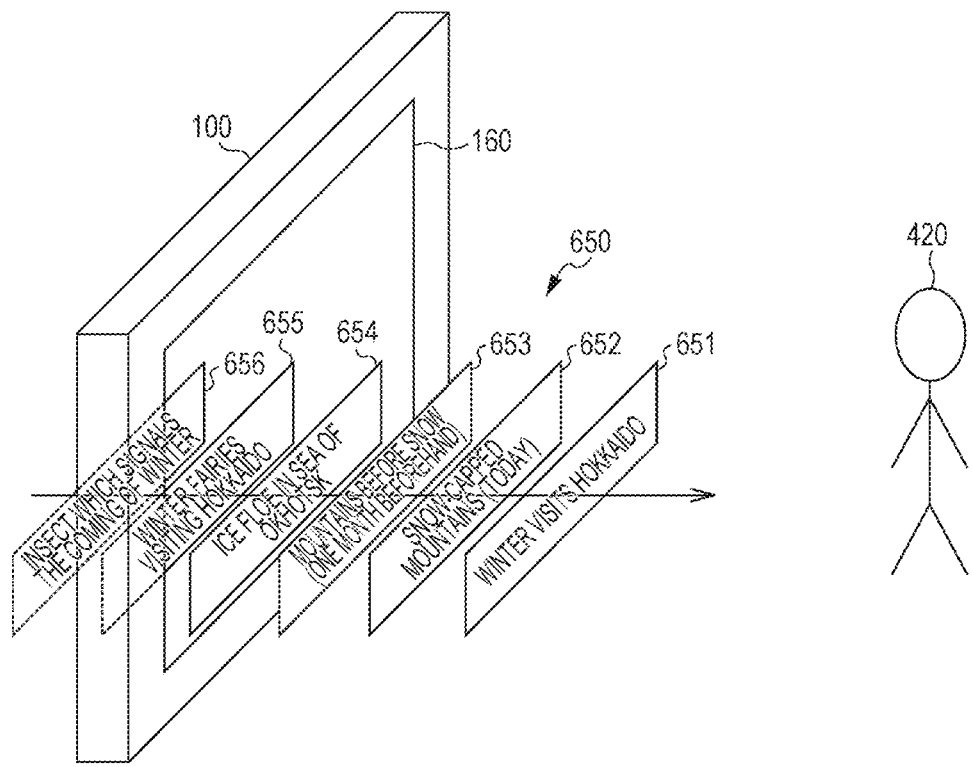
FIGS. 18A and 18B are diagrams illustrating a relationship between the display section and a virtual display position of character information which is displayed in the display section according to the second embodiment of the present disclosure.
Figure 18B:
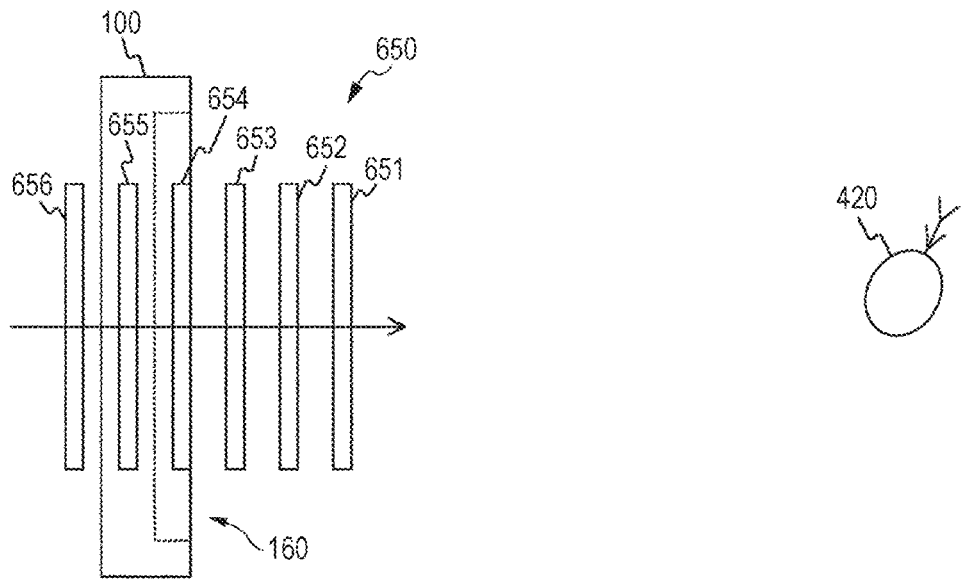

FIGS. 18A and 18B are diagrams illustrating a relationship between the display section 160 and a virtual display position of the character information which is displayed in the display section 160 according to the second embodiment of the present disclosure. Here, the relationship of the virtual display position of the character information shown in FIGS. 18A and 18B is the same as the example shown in FIGS. 6A and 6B.

Figure 17A:
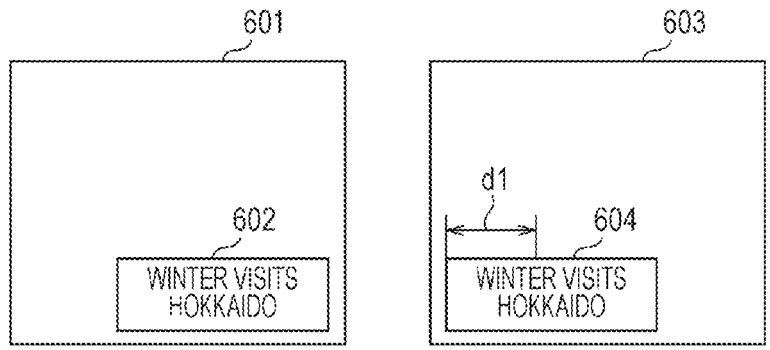
FIGS. 17A to 17D are diagrams illustrating a stereoscopic image for displaying character information in a stereoscopic manner in a display section according to a second embodiment of the present disclosure.

In FIG. 17A, a stereoscopic image (left eye image (first layer) 601 and right eye image (first layer) 603) is shown for displaying the foremost character information. A rectangular region 602 which corresponds to the character information is included in the left eye image (first layer) 601 and a rectangular region 604 which corresponds to the character information is included in right eye image (first layer) 603. In addition, a staggering amount of the rectangular regions 602 and 604 between the left eye image (first layer) 601 and the right eye image (first layer) 603 is shown as d1.

In addition, the α value is set for the rectangular regions 602 and 604 as the foremost character information in the same manner as the first embodiment of the present disclosure (however, α=0 in the character region). Here, a region other than the rectangular region 602 of the left eye image (first layer) 601 is set to be transparent (that is, α=1) and a region other than the rectangular region 604 of the right eye image (first layer) 603 is set to be transparent.

Here, when the left eye image (first layer) 601 and the right eye image (first layer) 603 are displayed in the display section 160, a case is assumed where the left eye of the user sees the left eye image (first layer) 601 and the right eye of the user sees the right eye image (first layer) 603. In this case, the rectangular regions 602 and 604 which are included in the left eye image (first layer) 601 and the right eye image (first layer) 603 are seen in a position in front of the display surface (a position of the character information 651) as shown in FIGS. 18A and 18B.

Here, in FIGS. 17A to 17D, for ease of description, the staggering amount of the rectangular regions included in the left eye image and the right eye image are shown to be comparatively large.

Figure 17B:
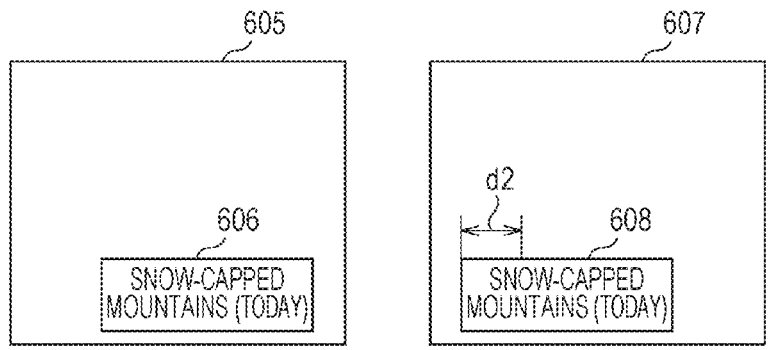

In FIG. 17B, a stereoscopic image (left eye image (second layer) 605 and right eye image (second layer) 607) is shown for displaying the character information next to the front. Here, the relationship of rectangular regions 606 and 608, a staggering amount d2, and the α value of the left eye image (second layer) 605 and the right eye image (second layer) 607 is the same as FIG. 17A.

In addition, when the left eye image (second layer) 605 and the right eye image (second layer) 607 are displayed in the display section 160, the rectangular regions 606 and 608 are seen in a position in front of the display surface (a position of the character information 652) as shown in FIGS. 18A and 18B.

Figure 17C:
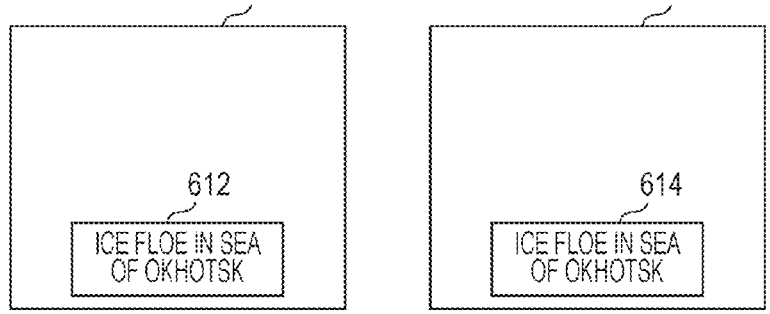

In FIG. 17C, a stereoscopic image (left eye image (fourth layer) 611 and right eye image (fourth layer) 613) is shown for displaying the character information next to the front. Here, the relationship of rectangular regions 612 and 614 and the α value of the left eye image (fourth layer) 611 and the right eye image (fourth layer) 613 is the same as FIG. 17A.

Here, there is no staggering amount since the rectangular regions 612 and 614 are equivalent to the position of the display surface (a position of the character information 654) as shown in FIGS. 18A and 18B. As a result, the rectangular regions 612 and 614 of the left eye image (fourth layer) 611 and the right eye image (fourth layer) 613 overlap.

Figure 17D:
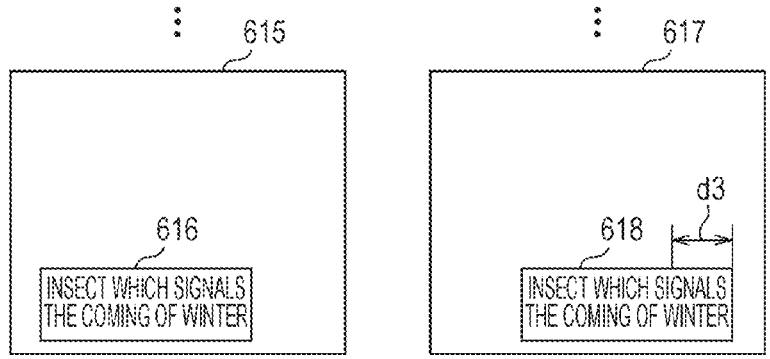

In FIG. 17D, a stereoscopic image (left eye image (sixth layer) 615 and right eye image (sixth layer) 617) is shown for displaying the character information in the rear. Here, the relationship of rectangular regions 616 and 618, a staggering amount d3, and the α value of the left eye image (sixth layer) 615 and right eye image (sixth layer) 617 is the same as FIG. 17A.

In addition, when the left eye image (sixth layer) 615 and right eye image (sixth layer) 617 are displayed in the display section 160, the rectangular regions 616 and 618 are seen in a position to the rear of the display surface (a position of the character information 656) as shown in FIGS. 18A and 18B.

Here, in FIGS. 17A to 17D, the diagrammatical representation and the description of third layer and the fifth layer which correspond to positions of the character information 653 and 655 shown in FIGS. 18A and 18B is omitted.

In this manner, in a case where the character information (the rectangular regions 612 and 614) in the position of the display surface is a reference, the character information which configures the stereoscopic effect (the rectangular regions 602, 604, and the like) are deviated in a horizontal direction in the stereoscopic image. In addition, in a case where the position of the display surface is a reference, the position of the staggering is the opposite for the character information (the rectangular regions 602, 604, and the like) which is projected outward and the character information (the rectangular regions 616, 618, and the like) which is drawn inward.

In this manner, since stereoscopic vision is acquired using parallax of the left and right eyes, the character information included in the left eye image and the right eye image is deviated in accordance with the display position (the position in the depth direction). That is, the staggering amount of the character information corresponds to a projected-out amount or a drawn-in amount of the stereoscopic object (3D object). Therefore, in the second embodiment of the present disclosure, the staggering amount (the projected-out amount or the drawn-in amount of the stereoscopic object) of the character information, which is related to the left eye image and the right eye image which configure the stereoscopic image, is held in the display control section 150 as a parameter.

In addition, the display section 150 overwrites and combines the respective left eye images and overwrites and combines the respective right eye images. In this case, the images with small layer numbers (the first layer, the second layer, and the like) are combined so as to be on an upper side. That is, in a case of overwriting and combining the left eye images, the left eye image (first layer) 601 is combined so as to be on top and the left eye image (sixth layer) 615 is combined so as to be on bottom. Here, it is assumed that the character information to the rear in the depth direction is difficult due to the combining. Therefore, for example, the rectangular regions which correspond to each item of the character information may be arranged so as to be deviated in the up and down direction. For example, according to a progression to the rear in the depth direction (that is, according to the layer numbers becoming larger), the rectangular regions which corresponds to each item of the character information are set so as to be deviated upward by a predetermined amount in the up and down direction. Due to this, it is possible for at least the rectangular regions which correspond to each item of the character information on the upper side to be recognized by the user as the stereoscopic images.

In this manner, the display control section 150 displays the display target character information as a stereoscopic image. In this case, the display control section 150 displays the display target character information so that the direction which goes substantially straight through the display surface of the display section 160 as the predetermined direction and the display target character information is lined up in the predetermined direction by being arranging in a three-dimensional space.

In addition, it is possible to apply the first embodiment of the present disclosure with regard to points other than the character information being a stereoscopic image. That is, it is possible to apply the display state shown in the first embodiment of the present disclosure also to the second embodiment of the present disclosure.

Here, in the embodiments of the present disclosure, an example is shown where the character information is displayed in predetermined units (for example, each sentence or each paragraph) in a lower portion of the display region in the display section 160. However, it is possible to appropriately change the position where the character information in the predetermined units is displayed. For example, it is possible to display in the upper portion, the center portion, the left or right edge portions of the display region of the display section 160.

In addition, in the embodiments of the present disclosure, an example is shown where the moving images and the character information are displayed at the same time in the one display section 160, but for example, the moving images and the character information may be displayed in a plurality of display sections. For example, the moving images may be displayed in one display section and the character information may be displayed in another display section. In this case, for example, it is possible to display the character information in the center portion of the display region of the other display section.

In addition, in the embodiments of the present disclosure, an example is shown where the foremost character information is moved in the depth direction according to the operation of pressing the up button 204 or the down button 205 on the remote control 200, the foremost character information may be changed using another operation method. For example, the foremost character information may be changed by the character information which is to be the foremost character information being operated by touch using a touch panel. In addition, for example, the foremost character information may be changed using an operation such as where there is pulling out of any of the display target character information using a touch panel.

In this manner, in the embodiments of the present disclosure, a concept of time in the depth direction is introduced and the character information is arranged in the depth direction along the time line which is provided from the broadcasting station. That is, the past character information is arranged in the depth direction along the time line. By the user operating the character information which is arranged in this manner, it is possible to easily view any character information by going back more into the past than the current timing. For example, it is possible to view the character information of which the reading was missed by the character information of which the reading was missed by the user being displayed in front using an operation of the remote control 200. In addition, it is possible to hold the character information, which is sequentially received while the past character information is displayed in front, in the character information holding section 130. As a result, it is possible to easily view the character information which is newer than the character information which is displayed in front using a user operation. Due to this, it is possible for the character information which is desired by the user to be easily viewed and it is possible for the convenience of the user to be further improved.

Here, the embodiments described above shown examples for the realization of the present disclosure and the items in the embodiments and the specific items of the present disclosure in the scope of the disclosure each have a corresponding relationship. In the same manner, the specific items of the present disclosure in the scope of the disclosure and the items in the embodiments of the present disclosure which are given the same name each have a corresponding relationship. However, the present disclosure is not limited to the embodiments and it is possible for the present disclosure to be realized by various modifications being carried out on the embodiments within the range that does not depart from the concept of the present disclosure.

In addition, the process sequence which is described in the embodiments described above may be taken as a method which is the series of sequences and may be taken as a program for executing the series of sequences on a computer and a recording medium which records the program. For example, it is possible to use a CD (Compact Disc), a MD (MiniDisc), a DVD (Digital Versatile Disk), a memory card, a Blu-ray Disc (registered trademark), or the like as the recording medium.

Here, it is possible for the present disclosure to be configured as below.

(1) An information processing device is provided with a display control section which sets one out of a plurality of items of character information related to moving images as the earliest character information and displays the earliest character information and one item or a plurality of items of character information, which is continuous with the earliest character information on the time axis, along with the moving images in the display section so as to be lined up in a predetermined direction from the earliest character information along the time axis as display target character information, and a control section which performs control so that the character information which is the earliest character information from the plurality of items of character information changes based on a user operation.

(2) The information processing device of (1) where the display control section displays the display target character information as a stereoscopic image.

(3) The information processing device of (2) where the display control section sets a direction which goes substantially straight through a display surface of the display section as the predetermined direction and displays the display target character information so as to be lined up in the predetermined direction by arranging the display target character information in a three-dimensional space.

(4) The information processing device of (1) where the display control section sets a direction which goes substantially straight through a display surface of the display section as the predetermined direction and displays the display target character information so as to be lined up in the predetermined direction by overwriting and combining the display target character information along the time axis so that the earliest character information is in front.

(5) Any of the information processing devices of (1) to (4) where the display control section sets the transparency in a display region of the display target character information so as to be reduced in accordance with heading in the predetermined direction from the earliest character information.

(6) The information processing device of (5) where the display control section sets the transparency only in a background region of a character out of the display region of the display target character information.

(7) Any of the information processing devices of (1) to (6) where, in a case where either a first operation for setting one out of two items of character information which are adjacent to the earliest character information on the time axis as the new earliest character information or a second operation for setting the other out of the two items of character information as the new earliest character information is received as the user operation, the control section performs a change so that either of the two items of character information become the new earliest character information based on the user operation.

(8) The information processing device of (7) where the first operation is an operation for setting the latter character information out of two items of character information as the new earliest character information and the second operation is an operation for setting the former character information out of the two items of character information as the new earliest character information, the display control section displays the display target character information so that the earliest character information out of the display target character information is the newest character information on the time axis, and the control section displays the new earliest character information adjacent to the earliest character information when the first operation was received in a case where the first operation was received and displays the new earliest character information by deleting the earliest character information when the second operation was received in a case where the second operation was received.

(9) Any of the information processing devices of (1) to (8) where a operation reception section, which receives an operation for switching between a first mode where a change with regard to character information which is the earliest character information is performed based on the user operation and a second mode where a change with regard to character information which is the earliest character information is performed according to the display of the moving images and a change is not performed based on the user operation, is further provided, and the control section changes between a display state of the display target character information in a case where the first mode is set and a display state of the display target character information in a case where the second mode is set.

(10) The information processing device of (9) where the control section changes the display state by changing a position of the earliest character information in the predetermined direction in a case where the first mode is set and a position of the earliest character information in the predetermined direction in a case where the second mode is set.

(11) Any of the information processing devices of (1) to (10) where the display control section displays the display target character information so that the earliest character information out of the display target character information is the newest character information on the time axis.

(12) Any of the information processing devices of (1) to (11) where the display control section displays so that the display target character information overlaps the moving images.

(13) An information processing method includes setting one out of a plurality of items of character information related to moving images as the earliest character information and displaying the earliest character information and one item or a plurality of items of character information, which is continuous with the earliest character information on the time axis, along with the moving images in the display section so as to be lined up in a predetermined direction from the earliest character information along the time axis as display target character information, and performing control so that the character information which is the earliest character information from the plurality of items of character information changes based on a user operation.

(14) A program which makes a computer execute setting one out of a plurality of items of character information related to moving images as the earliest character information and displaying the earliest character information and one item or a plurality of items of character information, which is continuous with the earliest character information on the time axis, along with the moving images in the display section so as to be lined up in a predetermined direction from the earliest character information along the time axis as display target character information, and performing control so that the character information which is the earliest character information from the plurality of items of character information changes based on a user operation.

It should be understood by those skilled in the art that various modifications, combinations, sub-combinations and alterations may occur depending on design requirements and other factors insofar as they are within the scope of the appended claims or the equivalents thereof.

What is claimed is:

1. A display controller, comprising:
a control section for controlling a display to display a sequence of images, first character information corresponding to a first displayed image of the sequence of images, and other character information corresponding to an image in the sequence of images which is prior to the first displayed image,
wherein the control section controls display of the first character information and the other character information in response to a user operation,
wherein the first character information and the other character information appear along a time axis of the display such that the first character information appears at a position corresponding to a first time and the other character information appears at a position corresponding to a second time, the first time being later than the second time.

2. A display controller, comprising:
a control section for controlling a display to display a sequence of images, first character information corresponding to a first displayed image of the sequence of images, and other character information corresponding to an image in the sequence of images which is prior to the first displayed image,
wherein the control section controls display of the first character information and the other character information in response to a user operation,
wherein the first character information and the other character information are displayed stereoscopically,
wherein the first character information and the other character information appear along a time axis that runs in a direction perpendicular to a screen of the display such that time advances along the axis in the direction toward the user, and such that the first character information appears to the user to be in front of the other character information.

3. A display controller, comprising:
a control section for controlling a display to display a sequence of images, first character information corresponding to a first displayed image of the sequence of images, and other character information corresponding to an image in the sequence of images which is prior to the first displayed image,
wherein the control section controls display of the first character information and the other character information in response to a user operation,
wherein the first character information and the other character information are displayed such that one of the first character information and other character information appears to overlay at least a portion of the other one.

4. The display controller as recited in claim 3, wherein at least a portion of the one of the first character information and the other character information is displayed in a transparent manner.

5. The display controller as recited in claim 4, wherein the one of the first character information and the other character information includes one or more text characters, and the non-character portion of the one of the first character information and the other character information is displayed in a transparent manner.

6. A display method, comprising:
controlling a display to display a sequence of images, first character information corresponding to a first displayed image of the sequence of images, and other character information corresponding to an image in the sequence of images which is prior to the first displayed image,
wherein controlling the display of the first character information and the other character information is performed in response to a user operation,
wherein the first character information and the other character information appear along a time axis of the display such that the first character information appears at a position corresponding to a first time and the other character information appears at a position corresponding to a second time, the first time being later than the second time.

7. A display method, comprising:

controlling a display to display a sequence of images, first character information corresponding to a first displayed image of the sequence of images, and other character information corresponding to an image in the sequence of images which is prior to the first displayed image, wherein controlling the display of the first character information and the other character information is performed in response to a user operation, wherein the first character information and the other character information are displayed stereoscopically, wherein the first character information and the other character information appear along a time axis that runs in a direction perpendicular to a screen of the display such that time advances along the axis in the direction toward the user, and such that the first character information appears to the user to be in front of the other character information.

8. A display method, comprising:

controlling a display to display a sequence of images, first character information corresponding to a first displayed image of the sequence of images, and other character information corresponding to an image in the sequence of images which is prior to the first displayed image, wherein controlling the display of the first character information and the other character information is performed in response to a user operation, wherein the first character information and the other character information are displayed such that one of the first character information and other character information appears to overlay at least a portion of the other one.

9. The display method as recited in claim 8, wherein at least a portion of the one of the first character information and the other character information is displayed in a transparent manner.

10. The display method as recited in claim 9, wherein the one of the first character information and the other character information includes one or more text characters, and the non-character portion of the one of the first character information and the other character information is displayed in a transparent manner.

* * * * *